US012776592B2

(12) United States Patent
Cardona, Jr. et al.

(10) Patent No.: US 12,776,592 B2
(45) **Date of Patent: *Oct. 27, 2026**

(54) ACTIVE DISTRIBUTED ANTENNA SYSTEM WITH FREQUENCY TRANSLATION AND SWITCH MATRIX

(71) Applicant: BeamX, Inc., Tucson, AZ (US)

(72) Inventors: Sergio E. Cardona, Jr., Tucson, AZ (US); Kevin W. Patrick, Tucson, AZ (US); Joel Blumke, Tucson, AZ (US); Silvio Cardero, Tucson, AZ (US)

(73) Assignee: BeamX, Inc., Tucson, AZ (US)

( * ) Notice: Subject to any disclaimer, the term of this patent is extended or adjusted under 35 U.S.C. 154(b) by 84 days.

This patent is subject to a terminal disclaimer.

(21) Appl. No.: 18/806,442

(22) Filed: Aug. 15, 2024

(65) Prior Publication Data

US 2024/0405450 A1 Dec. 5, 2024

Related U.S. Application Data

(63) Continuation-in-part of application No. 18/175,692, filed on Feb. 28, 2023, now abandoned, which is a (Continued)

(51) Int. Cl.
*H01Q 21/20* (2006.01)
*H01Q 1/40* (2006.01)

(Continued)

(52) U.S. Cl.
CPC ........... *H01Q 21/205* (2013.01); *H01Q 1/405* (2013.01); *H01Q 3/36* (2013.01); *H01Q 21/065* (2013.01)

(58) Field of Classification Search
CPC .......... H01Q 1/405; H01Q 3/242; H01Q 3/36; H01Q 13/24; H01Q 21/065; H01Q 21/205; H01Q 21/28
See application file for complete search history.

(56) References Cited

U.S. PATENT DOCUMENTS 4,122,406 A 10/1978 Salzberg
10,418,679 B2 9/2019 Parekh et al.

(Continued)

FOREIGN PATENT DOCUMENTS

WO 2018051238 A1 3/2018
WO 2019221920 A1 11/2019

OTHER PUBLICATIONS

Hui et al. "Numerical and experimental studies of a helical antenna loaded by a dielectric resonator." Radio Science 32.2 (1997): 295-304.

(Continued)

*Primary Examiner* — Hoang V Nguyen
(74) *Attorney, Agent, or Firm* — NGUYEN TARBET IP LAW

(57) ABSTRACT

A three-dimensional, 360 degree, omnidirectional multiple-input multiple-output wireless system is described herein. The multiple-input multiple-output wireless system includes a plurality of radio inputs, a plurality of radio-frequency converters, an RF signal distribution network, a plurality of transceivers, and a plurality of antennas. The multiple-input multiple-output wireless system may further have a plurality of planar stacks.

18 Claims, 9 Drawing Sheets

Related U.S. Application Data continuation of application No. 17/449,915, filed on Oct. 4, 2021, now abandoned, which is a continuation of application No. 16/987,068, filed on Aug. 6, 2020, now Pat. No. 11,139,587, which is a continuation-in-part of application No. 16/830,065, filed on Mar. 25, 2020, now Pat. No. 10,784,591, which is a continuation-in-part of application No. 16/750,337, filed on Jan. 23, 2020, now abandoned.

(60) Provisional application No. 62/979,765, filed on Feb. 21, 2020, provisional application No. 62/795,934, filed on Jan. 23, 2019.

(51) Int. Cl.
*H01Q 3/36* (2006.01)
*H01Q 21/06* (2006.01)

(56) References Cited

U.S. PATENT DOCUMENTS

| | | | |
|---|---|---|---|
| 2003/0003881 | A1 | 1/2003 | Anim-Appiah et al. |
| 2003/0146872 | A1 | 8/2003 | Kellerman et al. |
| 2006/0103576 | A1 | 5/2006 | Mahmoud et al. |
| 2009/0278759 | A1 | 11/2009 | Moon et al. |
| 2011/0001680 | A1 | 1/2011 | Leisten |
| 2011/0281603 | A1 | 11/2011 | Lastinger et al. |
| 2012/0092089 | A1 | 4/2012 | Zhu et al. |
| 2012/0188142 | A1 | 7/2012 | Shashi et al. |
| 2012/0287018 | A1 | 11/2012 | Parsche |
| 2013/0214871 | A1 | 8/2013 | Nakamura et al. |
| 2015/0048996 | A1 | 2/2015 | Aubert et al. |
| 2016/0029225 | A1 | 1/2016 | Hu |
| 2016/0359539 | A1 | 12/2016 | Ashrafi et al. |
| 2017/0093693 | A1 | 3/2017 | Barzegar et al. |
| 2017/0222334 | A1 | 8/2017 | Shtrom et al. |
| 2017/0318589 | A1 | 11/2017 | Negus |
| 2018/0090830 | A1 | 3/2018 | McMichael et al. |
| 2018/0331720 | A1 | 11/2018 | Adriazola et al. |
| 2019/0028159 | A1* | 1/2019 | Bisiules .................. H01Q 5/48 |
| 2019/0103665 | A1 | 4/2019 | Yoo et al. |
| 2019/0181926 | A1 | 6/2019 | Liang et al. |
| 2019/0348759 | A1 | 11/2019 | Walker et al. |
| 2019/0379427 | A1 | 12/2019 | Geekie et al. |
| 2019/0392694 | A1 | 12/2019 | Funaki et al. |
| 2021/0159608 | A1 | 5/2021 | Verd et al. |
| 2021/0167811 | A1 | 6/2021 | Henry et al. |

OTHER PUBLICATIONS

Rousstia et al., "Switched-beam array of dielectric rod antenna with RF-MEMS switch for millimeter-wave applications", Radio Sci., 2015, 50, 177-190.

Black et al., "Breaking Down mmWave Barriers with Holographic Beam Forming", MW Journal, Feb. 2020, vol. 63, No. 2.

Rein, Steve. "Waveguide Primer." Microwaves101, everythingRF, p. 1-7, Accessed Jan. 12, 2022. https://www. microwaves101.com/encyclopedias/waveguide-primer.

Chu, Qing-Xin, Ding-Liang Wen, and Yu Luo. "A broadband dual-polarized antenna with Y-shaped feeding lines." IEEE Transactions on Antennas and Propagation 63.2 (2015): 483-490.

* cited by examiner

ACTIVE DISTRIBUTED ANTENNA SYSTEM WITH FREQUENCY TRANSLATION AND SWITCH MATRIX

CROSS-REFERENCES TO RELATED APPLICATIONS

This application is a continuation-in-part and claims benefit of U.S. patent application Ser. No. 18/175,692, filed Feb. 28, 2023, which is a continuation and claims benefit of U.S. patent application Ser. No. 17/449,915, filed Oct. 4, 2021, which is a continuation and claims benefit of U.S. patent application Ser. No. 16/987,068, filed Aug. 6, 2020, now U.S. Pat. No. 11,139,587, which is a non-provisional and claims benefit of U.S. patent application No. 62/979,765 filed Feb. 21, 2020, the specification of which is incorporated herein in its entirety by reference.

U.S. patent application Ser. No. 16/987,068, filed Aug. 6, 2020, now U.S. Pat. No. 11,139,587 is also a continuation-in-part and claims benefit of U.S. patent application Ser. No. 16/830,065, filed Mar. 25, 2020, now U.S. Pat. No. 10,784,591, which is a continuation-in-part and claims benefit of U.S. patent application Ser. No. 16/750,337, filed Jan. 23, 2020, now abandoned, which is a non-provisional and claims benefit of U.S. Patent Application No. 62/795,934, filed Jan. 23, 2019, the specifications of which are incorporated herein in their entirety by reference.

U.S. patent application Ser. No. 16/830,065, filed Mar. 25, 2020, now U.S. Pat. No. 10,784,591, is also a non-provisional and claims benefit of U.S. Patent Application No. 62/979,765 filed Feb. 21, 2020, the specification of which is incorporated herein in its entirety by reference.

FIELD OF THE INVENTION

The present invention is directed to active distributed antenna systems (DAS), in particular, to multi-input, multi-output re-configurable DAS with frequency translation.

BACKGROUND OF THE INVENTION

An antenna is a device for efficiently radiating electromagnetic energy into free space, from a system that otherwise confines its electromagnetic energy. An antenna that radiates electromagnetic energy equally in all spatial directions in three-dimensional space may be deemed an isotropic radiator. By contrast, in certain applications it is advantageous to create an anisotropic radiator, one which largely confines the radiation to within a narrow beam in a specific desired direction. Common methods to direct the radiation pattern of an antenna (radiating structure) from one orientation in three-dimensional space to another may involve either physically reorienting the antenna mechanism, or employing precise phase control among a collection of fixed antenna elements. Both of these methods must overcome the inertia of either the mechanism, or of the phase control actuating element, an inertia which in turn limits the agility with which the beam may be redirected.

BRIEF SUMMARY OF THE INVENTION

It is an objective of the present invention to provide systems, devices and methods that allow for efficient radio coverage of a wide angular region, as specified in the independent claims. Embodiments of the invention are given in the dependent claims. Embodiments of the present invention can be freely combined with each other if they are not mutually exclusive.

Wireless networking infrastructure meeting standards that may be deployed in the near future, such as for 5G networking, may drive demand for far more precise control of the direction, polarization, and level of over-the-air electromagnetic radiation than may have been the case for prior wireless networking standards. This demand may apply equally to radiated electromagnetic power as well as to received electromagnetic power. Accordingly, sophisticated radiating structures may be necessary, structures whose pattern of radiation may be highly configurable in direction, polarization, and power level, structures that may interface with several radios simultaneously in a dynamically assigned manner.

Accordingly, the present invention may integrate the features of both a sophisticated radiating structure capable of addressing 360 degrees of azimuth and 60 degrees of elevation, together with a utility for up-conversion and down-conversion that may correspond with multiple external radios simultaneously, all into a single multiple-input, multiple-output wireless system. The present invention quantizes the orientation of a sophisticated radiating structure's beam into a finite set of solid-angular sub-regions that may be rapidly re-selected, such that the inertia to direct the beam from one solid-angular sub-region to another is almost infinitesimal. Moreover, in the present invention, because multiple radios may access a shared sophisticated radiating structure, each solid-angular sub-regional antenna element may deploy its own independent beam that may be distinguished from neighboring beams by any to all of: its carrier frequency; its polarization of radiation; and its power level. Further, the present invention may hide the complexity of a radiating structure operating at a comparatively high frequency of radiation by presenting it as having an interface that may appear as one at a comparatively low frequency of radiation, which is more readily accommodated. Once such a system has been realized, the system may find further application in dual-use technologies suitable for electronic warfare.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The features and advantages of the present invention will become apparent from a consideration of the following detailed description presented in connection with the accompanying drawings in which.

Figure 1A:
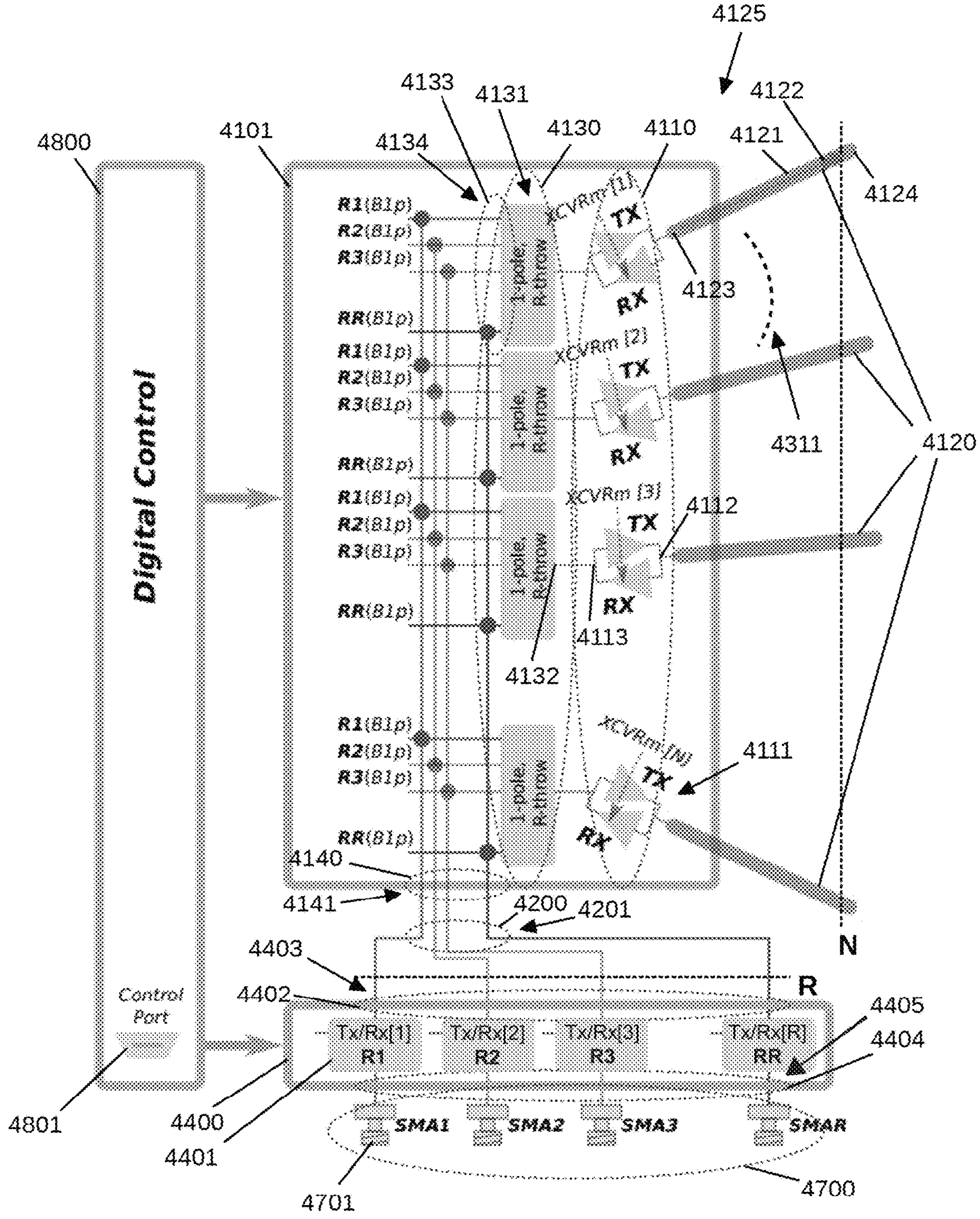
FIG. 1A shows a diagram of a planar stack (4101) of N oriented antennas (4121), a plurality of radios (4400) R in number, and a digital control logic (4800). (N and R are some positive integers.)
Figure 1B:
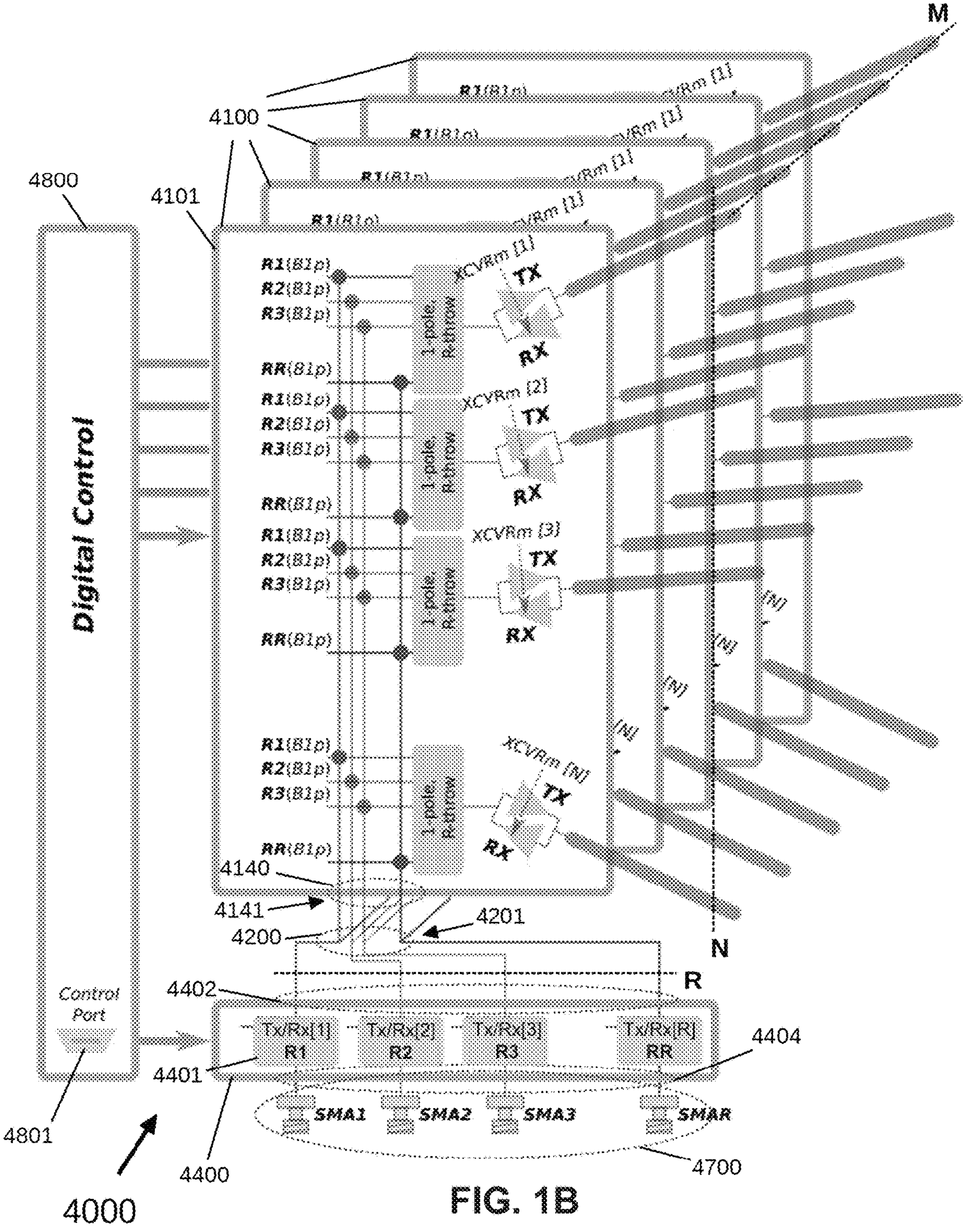
FIG. 1B shows an extension of the multiple-input multiple-output wireless system (MIMO) (4000) diagrammed in FIG. 1A. A plurality of planar stacks (4100) M in number accesses a plurality of radio feeds (4200) from the plurality of radios (4400). (M is some positive integer.) Each planar stack (4101) is individually controllable by the digital control logic (4800).
Figure 1C:
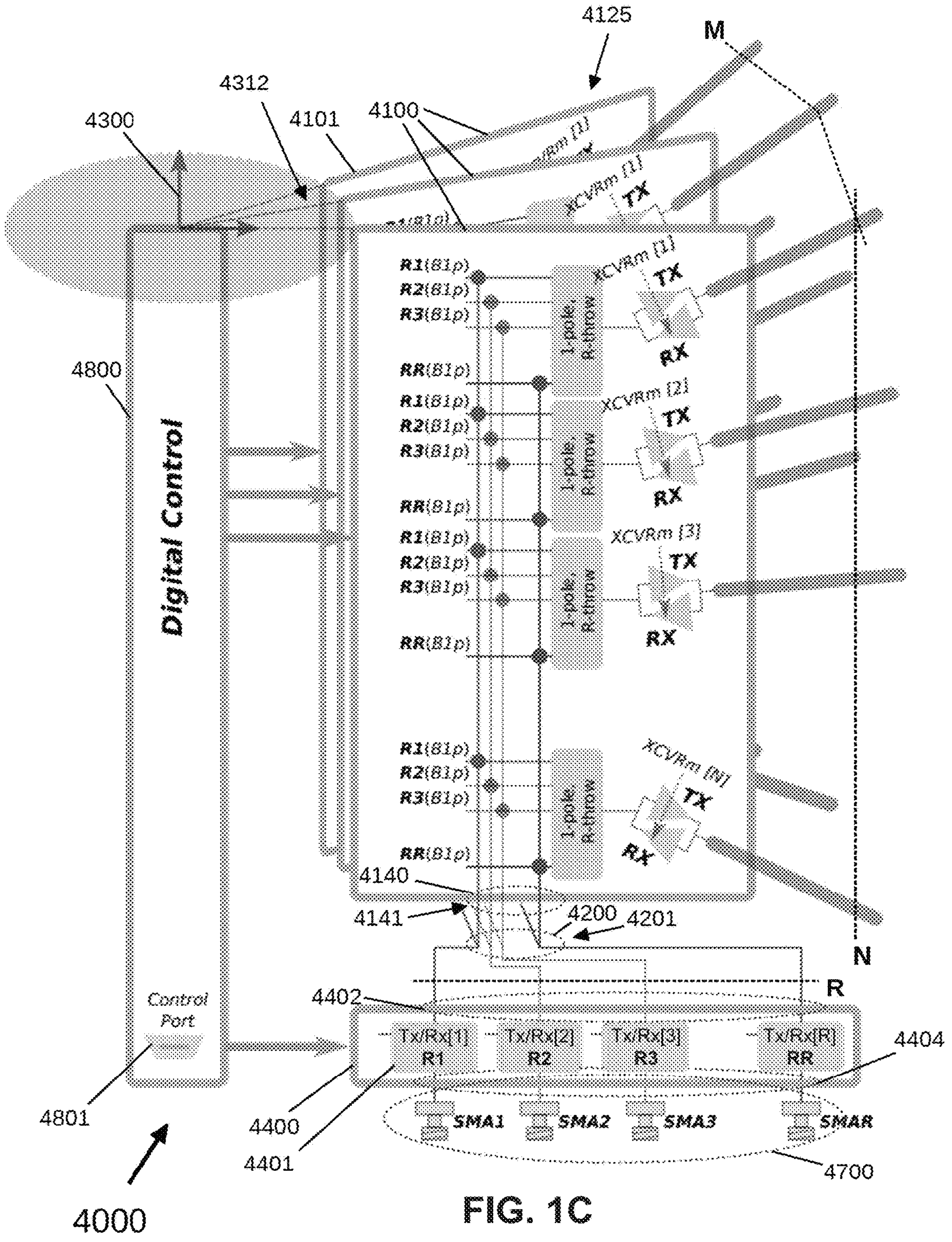

FIG. 1C shows in more detail the physical orientation of the various planar stacks (4101) among the plurality of planar stacks (4100) M in number. Each planar stack (4101), among the plurality of planar stacks (4100) M in number, is offset in its angular orientation from its nearest neighbor by a constant inter-plane angular offset (4312), about an array axis of symmetry (4300), in a fanned arrangement.

Figure 2A:
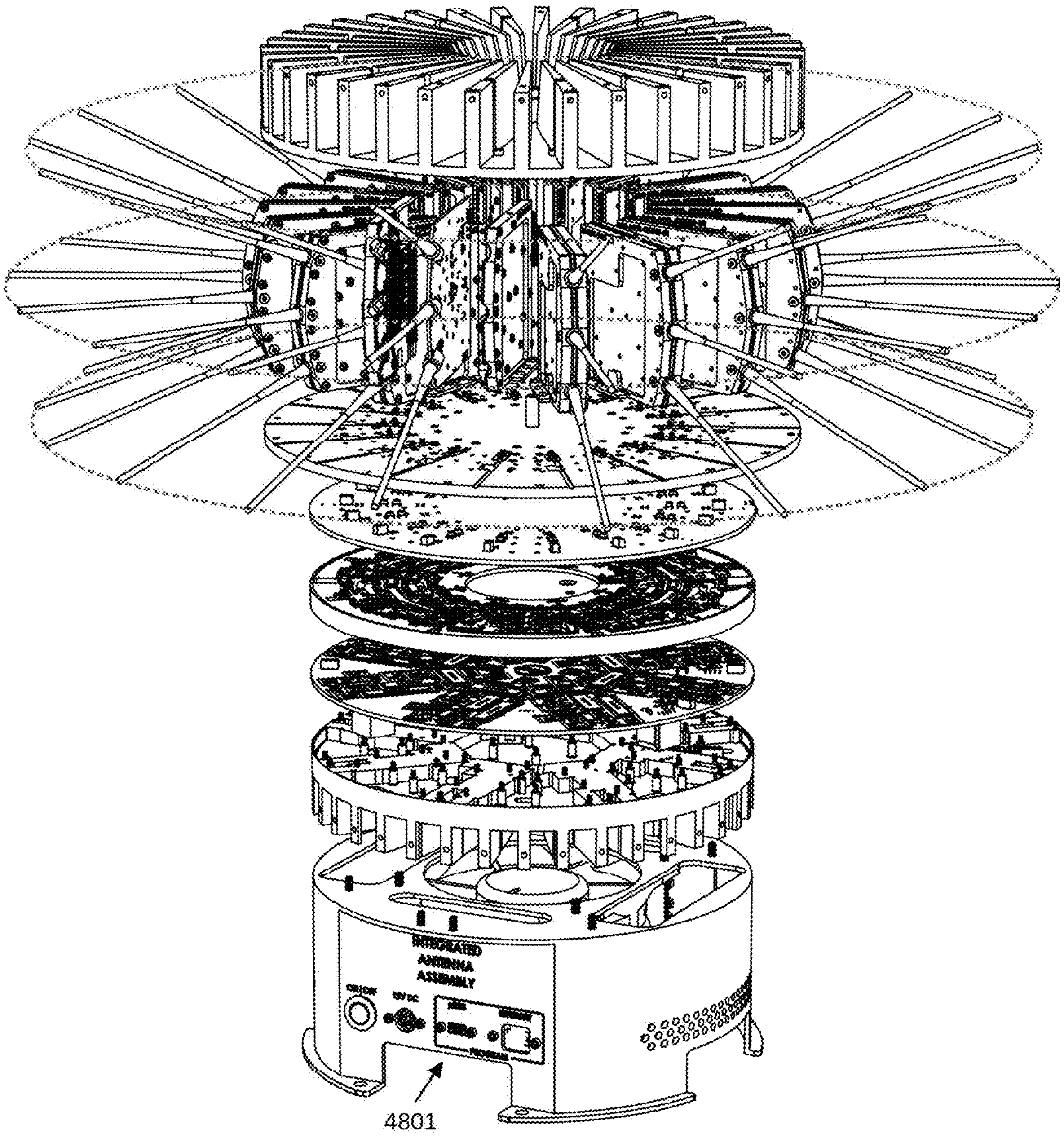

FIG. 2A shows a technical drawing of the mechanical assembly (in an exploded view, from the front) of the multiple-input multiple-output wireless system (MIMO) (4000), overlaid with reference circles for each row of oriented antennas (4121) M in number. Here, M=18 and N=3. The control port (4801) for the digital control logic (4800) is visible at the base of the mechanical assembly.

Figure 2B:
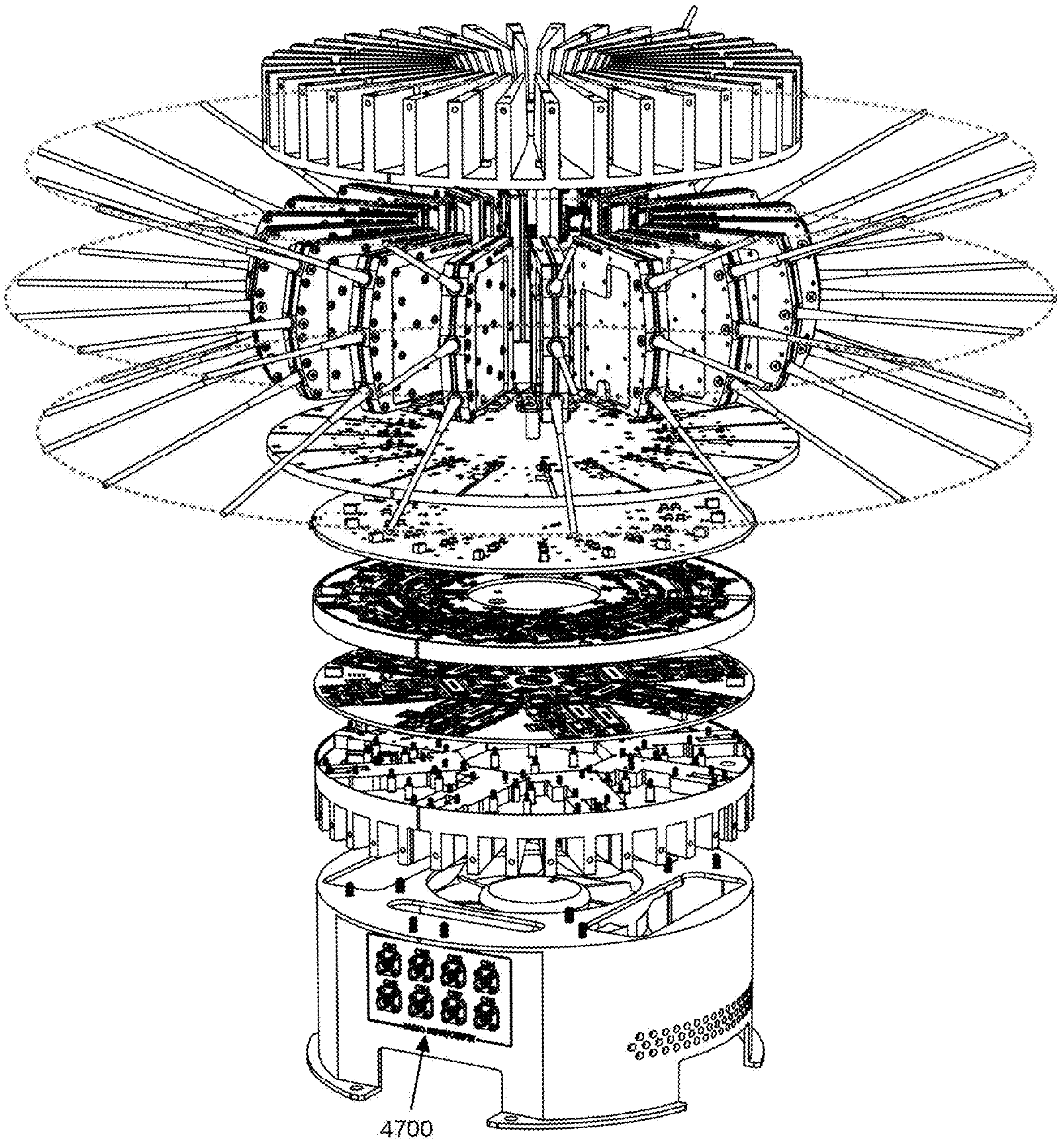

FIG. 2B shows a technical drawing of the mechanical assembly (in an exploded view, from the rear) of the multiple-input multiple-output wireless system (MIMO) (4000), overlaid with reference circles for each row of oriented antennas (4121) M in number. The plurality of input-output radio-frequency connectors (4700) is visible at the base of the mechanical assembly.

Figure 3A:
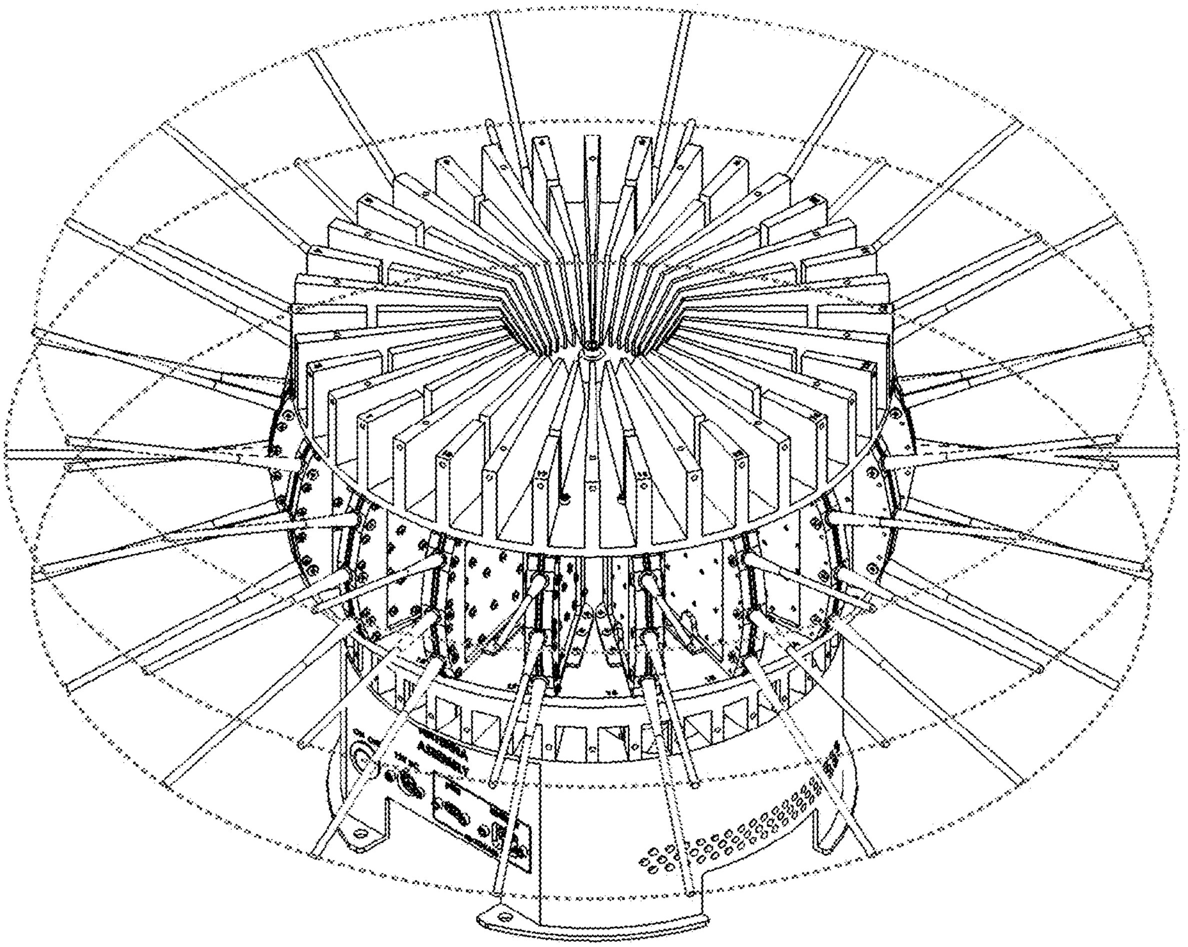

FIG. 3A shows a technical drawing of the mechanical assembly (in orthogonal view, from the front quarter) of the multiple-input multiple-output wireless system (MIMO) (4000), overlaid with reference circles for each row of oriented antennas (4121) M in number.

Figure 3B:
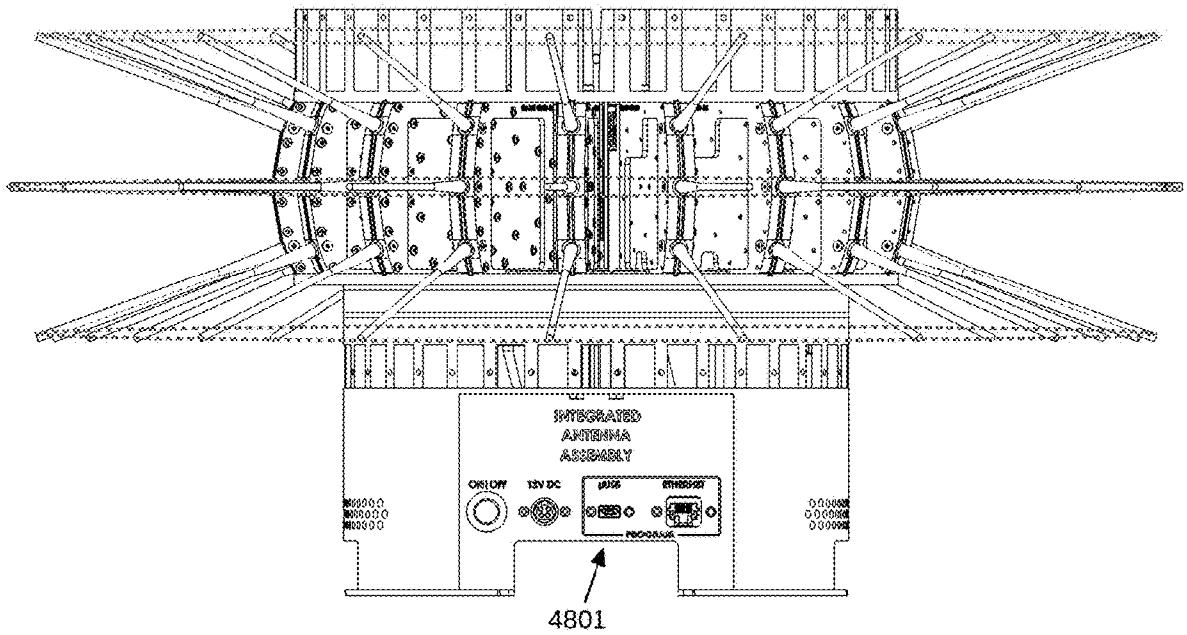

FIG. 3B shows a technical drawing of the mechanical assembly (in front view) of the multiple-input multiple-output wireless system (MIMO) (4000), overlaid with reference circles for each row of oriented antennas (4121) M in number. The control port (4801) for the digital control logic (4800) is visible at the base of the mechanical assembly.

Figure 4:
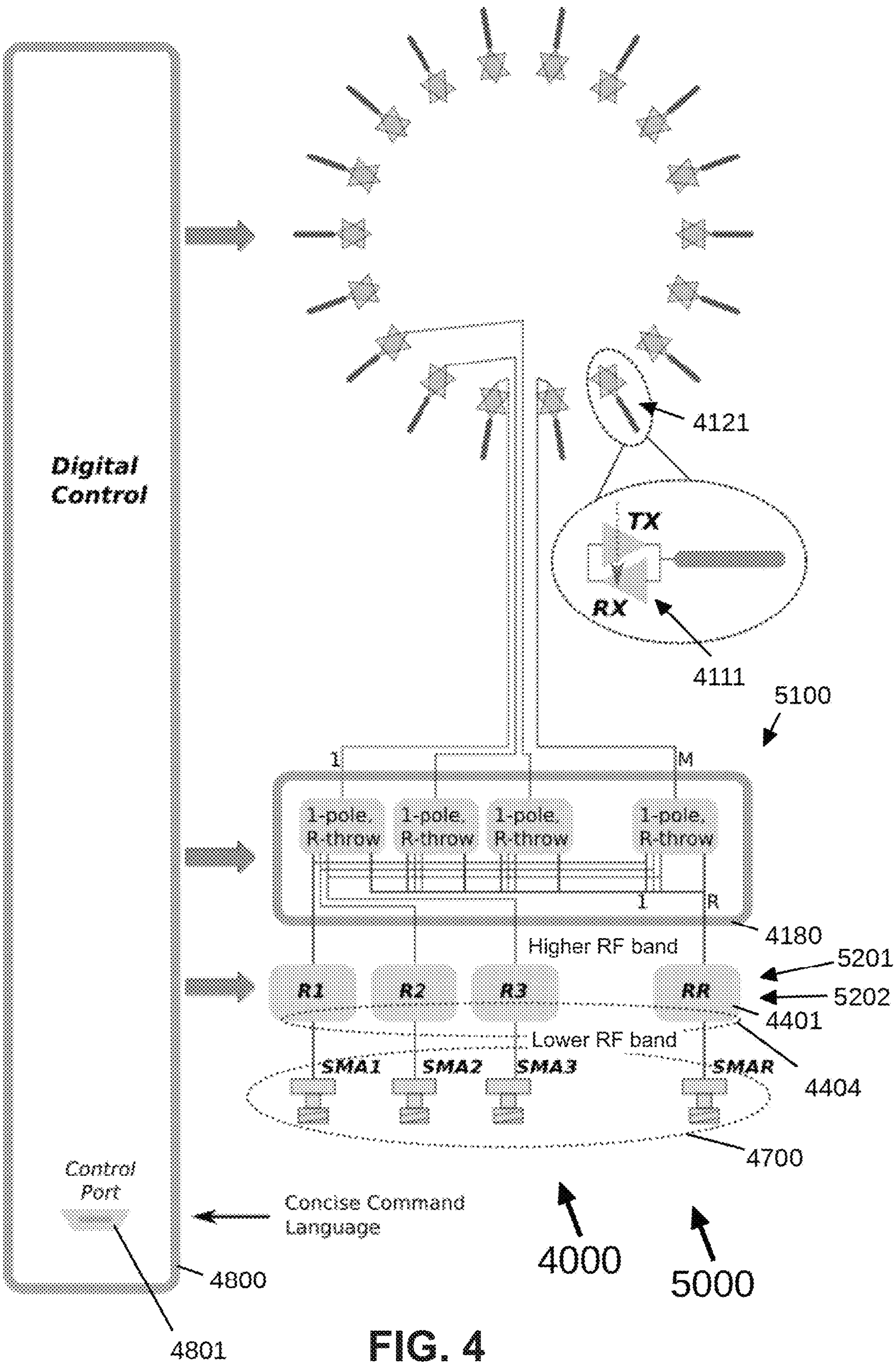

FIG. 4 shows a high-level schematic view of the entire multiple-input multiple-output wireless system (MIMO) (4000), including a plurality of oriented antennas (4121) with integrated transceiver blocks (4111), radio-frequency fanning network (4180), plurality of radios (4401) and digital control logic (4800).

Figure 5:
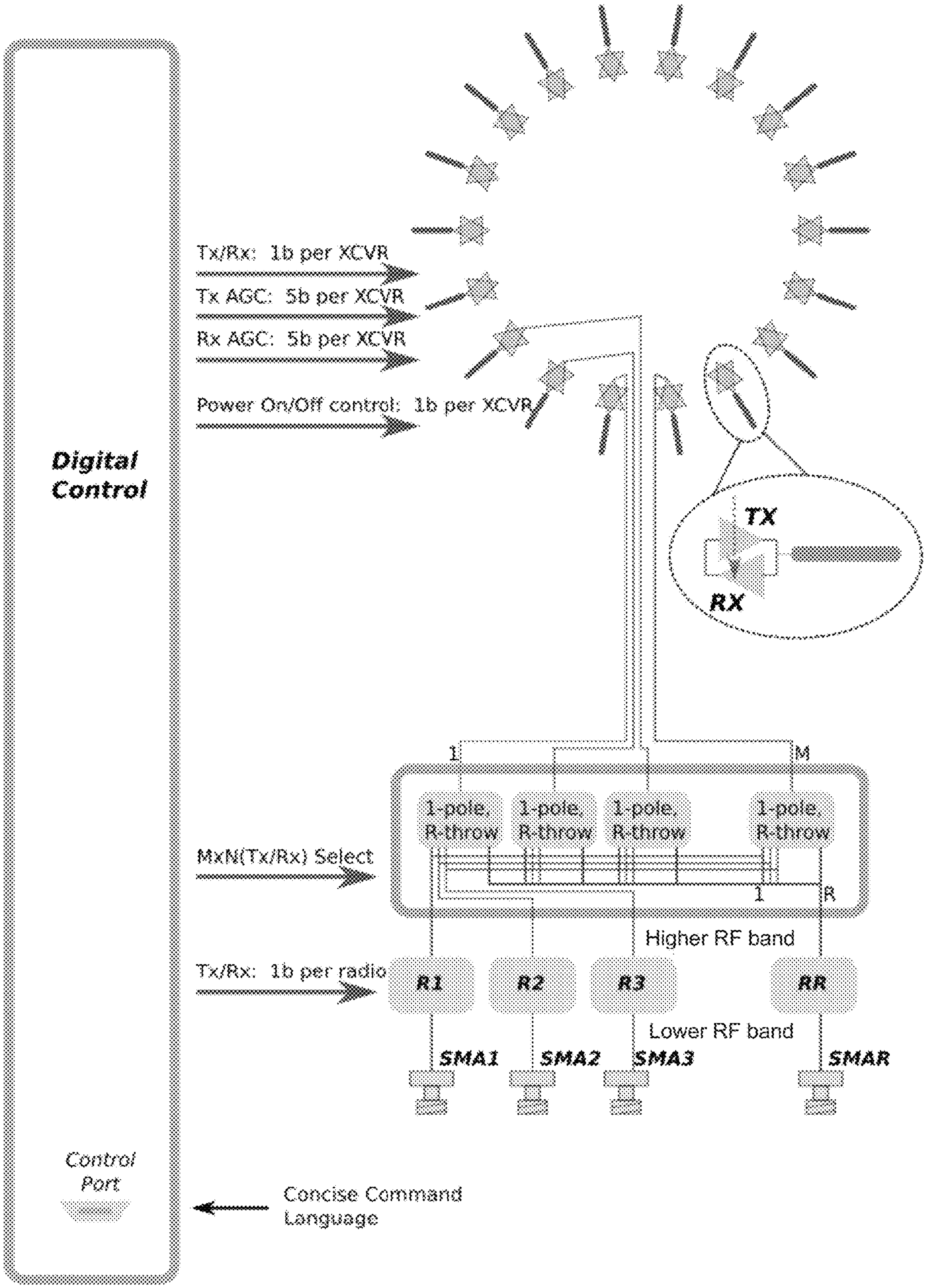

FIG. 5 shows the multiple-input multiple-output wireless system (MIMO) (4000) of FIG. 4, wherein the roster of control signals from the digital control logic (4800) to other components may be more explicitly detailed. Specifically, each transceiver block (4111) may be controlled by: 1 bit for transmit/receive state; 5 bits for transmit automatic gain control (AGC); and 5 bits for receive automatic gain control (AGC). The radio-frequency fanning network (4180) may be controlled by: a plurality of transmit/receive control lines; and a plurality of M×N select lines. Each radio (4401) may be controlled by: 1 bit for transmit/receive state.

DETAILED DESCRIPTION OF THE INVENTION

Following is a list of elements corresponding to a particular element referred to herein:

4000 multiple-input, multiple-output wireless system (MIMO)
4100 plurality of planar stacks
4101 planar stack
4110 plurality of transceiver blocks
4111 transceiver block
4112 transceiver block first port
4113 transceiver block second port
4120 plurality of oriented antennas
4121 oriented antenna
4122 Poynting ray
4123 stem
4124 tip
4125 Poynting plane
4130 plurality of 1-pole R-throw radio selectors
4131 1-pole R-throw radio selector
4132 radio selector common port
4133 radio selector plurality of switch ports
4134 radio selector switch port
4140 plurality of stack radio feed ports
4141 stack radio feed port
4180 radio-frequency fanning network
4200 plurality of radio feeds
4201 radio feed
4300 array axis of symmetry
4311 inter-ray angular offset
4312 inter-plane angular offset
4400 plurality of radios
4401 radios
4402 plurality of radio feed ports
4403 radio feed port
4404 plurality of input-output radio-frequency ports
4405 input-output radio frequency port
4700 plurality of input-output radio-frequency connectors
4701 input-output radio-frequency connector
4800 digital control logic
4801 control port
5000 media access controller
5100 interconnect fabric
5101 routing network
5201 telecommunication terminal
5202 remote sensing terminal The term "Poynting ray" is defined herein as a directional transfer of energy (e.g. electromagnetic waves) through a surface, measured as the energy transfer per unit area, per unit time.

The term "interconnect fabric" is defined herein as a mesh of connections between network devices (e.g. antennas and radios) that transports data between said devices.

The term "solid-angular coverage" is defined herein as a field of view that is covered by a reception and/or transmission range of the radios in the system of the present invention.

The present invention features a three-dimensional (3D) multiple-input multiple-output wireless system (MIMO) (4000). In some embodiments, the MIMO (4000) may comprise N oriented antennas (4120) each pointing in a unique direction in 3D space and each comprising a transceiver block (4111). N may be a first fixed positive integer. Each oriented antenna may comprise a Poynting ray (4122). Each oriented antenna may be configured to emit a beam of linearly dual-polarized electromagnetic wave energy along the Poynting ray (4122) and receive electromagnetic wave energy along a negative of the Poynting ray (4122). Each Poynting ray (4122) may be offset in an angular orientation from each adjacent Poynting ray. Each oriented antenna may dominate, within a respective sub-region of solid-angular coverage, the response of all other oriented antennas.

In some embodiments, the MIMO (4000) may further comprise a radio-frequency fanning network (4180), configured to connect electrically at most one radio with each oriented antenna at any given instant. The MIMO (4000) may further comprise R radios (4401). R may be a second fixed positive integer. The MIMO (4000) may further comprise a digital control logic (4800), configured to control a coordinated operation of the R radios (4401), the radio-frequency fanning network (4180), and the N transceiver blocks. Control of radiated power and received sensitivity to each sub-region may be orthogonal. Any first given radio, from among the R radios (4401), may be configured to address any given subset of all solid-angular sub-regions. Then, any second given radio may be configured to address any subset of remaining solid-angular sub-regions not yet addressed. A pattern established for the first given radio and the second given radio may be continued such that each of the remaining radios in turn is configured to address any subset of the remaining solid-angular sub-regions not yet addressed, until either no solid-angular sub-regions remain unaddressed, or all R radios (4401) require no further solid-angular sub-regions of address, so as to provide efficient radio coverage of the entire solid-angular region addressed wirelessly by the MIMO (4000), with respect to a location of the MIMO (4000).

The present invention features a three-dimensional (3D) multiple-input multiple-output wireless system (MIMO) (4000). In some embodiments, the MIMO (4000) may comprise a plurality of radios (4401). The MIMO (4000) may further comprise a plurality of mutually uniquely oriented active antennas (4120), each antenna configured to emit a beam of linearly dual-polarized electromagnetic wave energy. The MIMO (4000) may further comprise an interconnect fabric (5100). A narrow beam of each active antenna may address a respective solid-angular region. The interconnect fabric (5100) and a gain level of each active antenna may be configured independently and dynamically so as to connect electrically each active antenna to any or none of the plurality of radios (4401) at any given time, so as to provide efficient radio coverage of a totality of solid-angular regions addressed wirelessly by the MIMO (4000).

In some embodiments, the interconnect fabric (5100) may be a routing network (5101) capable of establishing an electrical connection between any active antenna and at most any single radio at any given time. The electrical connection may be bi-directional. In some embodiments, a first given radio may be configured to address any given subset of the totality of solid-angular regions. A second given radio may be configured to address any subset of the remaining solid-angular regions not yet addressed. A pattern established for the first given radio and the second given radio may be continued such that each of the remaining radios in turn is configured to address any subset of the remaining solid-angular regions not yet addressed, until either no solid-angular regions remain unaddressed, or the plurality of radios (4401) require no further solid-angular regions of address.

In some embodiments, each active antenna may dominate all other active antennas, within a respective region of solid-angular coverage. In some embodiments, the MIMO (4000) may be configured to affect independent control of radiated electromagnetic wave power, and incident electromagnetic wave power sensitivity, for each active antenna. In some embodiments, the active antennas (4120) and the interconnect fabric (5100) may be controlled by a digital control logic (4800). The digital control logic (4800) may be controlled by a control port (4801). In some embodiments, each active antenna may have a Poynting ray (4122). Each active antenna may be configured to emit electromagnetic wave energy along the Poynting ray (4122) and receive electromagnetic wave energy along a negative of the Poynting ray (4122). Each Poynting ray (4122) may be offset in an angular orientation from each adjacent Poynting ray by an inter-ray angular offset (4311), in a fanned arrangement, or in another polymorphic arrangement.

In some embodiments, the MIMO (4000) may have a digital control logic (4800). The digital control logic (4800) may be configured to coordinate an operation of the plurality of radios (4401) and the plurality of active antennas (4120) to either up-convert or down-convert. Each active antenna may be configured to up-convert whenever the radio to which said active antenna is electrically connected performs up-conversion. Each active antenna may be configured to down-convert whenever the radio to which said active antenna is electrically connected performs down-conversion. In some embodiments, the digital control logic (4800) may be configured to direct an operation of each active antenna so as to apply a variable level of radio-frequency amplification specific to said active antenna.

The present invention features a three-dimensional (3D) multiple-input multiple-output wireless system (MIMO) (4000). In some embodiments, the MIMO (4000) may comprise N oriented antennas (4120), each pointing in a unique direction in three-dimensional (3D) space, and each comprising a transceiver block (4111), each antenna configured to emit a beam of linearly dual-polarized electromagnetic wave energy. N may be a first fixed, positive integer. The MIMO (4000) may further comprise R radios (4401). R may be a second fixed, positive, integer. The MIMO (4000) may further comprise a radio-frequency fanning network (4180), configured to connect electrically at most one radio of the R radios (4401) with each oriented antenna at any given instant. The MIMO (4000) may further comprise a digital control logic (4800), having a control port (4801) by which to receive commands, the digital control logic (4800) configured to control a coordinated operation of the radios (4401), the radio-frequency fanning network (4180), and the transceiver blocks. A control of radiated power and received sensitivity to each oriented antenna may be orthogonal, so as to provide efficient radio coverage of an entire solid-angular region addressed wirelessly by the MIMO (4000), with respect to a location of the MIMO (4000).

In some embodiments, the MIMO (4000) may further comprise M planar stacks (4100), wherein M is a fixed positive integer. Each of the M planar stacks (4100) may comprise a plurality of the N oriented antennas (4120). In some embodiments, each of the oriented antennas (4120) in each planar stack (4101) may be offset in angular orientation from each adjacent oriented antenna in the same planar stack (4101) by a constant inter-plane angular offset (4312), such that the plurality of planar stacks (4100) forms a fanned arrangement about an array axis of symmetry, wherein the constant inter-plane angular offset (4312) is 360/M degrees. In some embodiments, each oriented antenna may have a Poynting ray (4122). Each oriented antenna may emit electromagnetic wave energy along the Poynting ray (4122). Each oriented antenna may receive electromagnetic wave energy along a negative of the Poynting ray (4122). Each Poynting ray (4122) may be offset in an angular orientation from each adjacent Poynting ray by an inter-ray angular offset (4311), in a fanned arrangement, or in another polymorphic arrangement. Each given oriented antenna may dominate, within a respective sub-region of solid-angular coverage, a response of all other oriented antennas.

In some embodiments, the sub-regions of solid-angular coverage may comprise a "pie slice" shaped segment of the solid-angular region having a point originating from the oriented antenna associated with the sub-region. In some embodiments, the solid-angular coverage region may comprise a plurality of equally-sized sub-regions. In some embodiments, the sub-regions may differ in size depending on a strength of the antenna associated with each sub-region.

In some embodiments, control of radiated power and received sensitivity to each sub-region, therefore, may be orthogonal. In some embodiments, any first given radio, from among the R radios (4401) may be configured to address any given subset of an entirety of solid-angular sub-regions. Then, any second given radio may be configured to address any subset of the remaining solid-angular sub-regions not yet addressed. A pattern established for the first given radio and the second given radio may be continued such that each of the remaining radios in turn is configured to address any subset of the remaining solid-angular sub-regions not yet addressed, until either no solid-angular sub-regions remain unaddressed, or all R radios (4401) require no further solid-angular sub-regions of address, so as to provide efficient radio coverage of the entire solid-angular region addressed wirelessly by the MIMO (4000), with respect to the location of the MIMO (4000).

In some embodiments, an interconnection and gain level of each oriented antenna may be configured independently and dynamically so as to connect each oriented antenna electrically to any or none of the plurality of radios (4401) at any given time. In some embodiments, each transceiver block (4111) may employ variable levels of radio-frequency power amplification. Each transceiver block (4111) may be configured to accept a transmit/receive mode control signal from the digital control logic (4800). In some embodiments, the radio-frequency fanning network (4180) may comprise a plurality of 1-pole R-throw radio selectors (4130). Each transceiver block (4111) may connect electrically to a radio selector common port (4132) of the respective 1-pole R-throw radio selector (4131) via a transceiver block second port (4113). A function of each given 1-pole R-throw radio selector (4131) may be that of a matched 1-pole R-throw switch between a plurality of switch ports (4133) and the common port of the given 1-pole R-throw radio selector (4131). The radio selector plurality of switch ports (4133) may comprise R radio selector switch ports. In some embodiments, the radio-frequency fanning network (4180) may comprise a plurality of stack radio feed ports (4140), comprising R stack radio feed ports. The plurality of stack radio feed ports (4140) may connect respectively, electrically, to the plurality of radio selector switch ports (4133) of every 1-pole R-throw radio selector (4131). Every plurality of stack radio feed ports (4140) may connect respectively, electrically to a plurality of radio feeds (4200), comprising R radio feeds.

Referring now to FIG. 1C and FIG. 3A, the present invention features a three-dimensional (3D), 360 degree, omnidirectional multiple-input multiple-output wireless system (MIMO) (4000). In FIG. 1C, the view is schematic, whereas FIG. 3A shows an orthogonal view of the mechanical implementation of an example embodiment of the present invention.

Referring now to FIG. 1C and FIG. 3A, a three-dimensional (3D), 360 degree, omnidirectional multiple-input multiple-output wireless system (MIMO) (4000) may comprise a plurality of planar stacks (4100); a plurality of radio feeds (4200); a plurality of radios (4400); and a digital control logic (4800). Together, the plurality of planar stacks (4100), the plurality of radio feeds (4200), the plurality of radios (4400), and the digital control logic (4800) may constitute the top-level structure of the present invention.

Referring now to FIG. 1C and FIG. 3A, the plurality of planar stacks (4100) may comprise M planar stacks (4101), wherein M is some first fixed positive integer. In the example embodiment of FIG. 3A, the number of planar stacks (4100), M, is 18, and the planar stacks (4101) are uniformly arranged about 360 degrees of azimuth. The terms azimuth and elevation, taken together as a pair, may uniquely describe a direction of orientation with respect to a given reference orientation in three-dimensional space. To demonstrate these terms by way of example, if the given reference orientation were a compass face at some given point on the northern hemisphere of Earth, then the north star, Polaris, would be observed by a telescope oriented at an azimuth of true north (0 degrees, within about 2 degrees), and at an elevation of about 90 degrees, minus the north latitude of the given point on the northern hemisphere of Earth. In mathematics, a spherical coordinate system is a coordinate system for three-dimensional space where the position of a point is specified by three numbers: the radial distance of that point from a fixed origin, its polar angle measured from a fixed zenith direction, and the azimuthal angle of its orthogonal projection on a reference plane that passes through the origin and is orthogonal to the zenith, measured from a fixed reference direction on that plane. It can be seen as the three-dimensional version of the polar coordinate system. The elevation angle may be equal to the negative of the polar angle, plus 90 degrees. The reference orientation of the present invention may be determined relative to the array axis of symmetry (4300), and the arbitrary selection of some given planar stack (4101).

Referring now to FIG. 1A and FIG. 3B, each planar stack (4101) may comprise a plurality of oriented antennas (4120), which may comprise N oriented antennas (4121); a plurality of transceiver blocks (4110); a plurality of 1-pole R-throw radio selectors (4130); and a plurality of stack radio feed ports (4140). N may be some second fixed positive integer, and R may be some third fixed positive integer. In the example embodiment of FIG. 3B, the number of oriented antennas (4121), N, is 3, and the oriented antennas (4121) are uniformly arranged, ranging from −20 degrees of elevation to +20 degrees of elevation. Therefore, the example embodiment of the present invention shown in FIG. 3B may be described in shorthand form by the parameter set {M=18, N=3}. In some embodiments, the beamwidth of the oriented antenna (4121) may be 20 degrees, and hence in this example, the solid-angular region of coverage may be within the range of minus 30 degrees to plus 30 degrees from the center oriented antenna (4121). This 60 degree coverage may be offset in elevation.

Referring now to FIG. 1A and FIG. 3A, each oriented antenna (4121) may emit and receive a narrow beam of electromagnetic radiation due solely to the physical construction of the oriented antenna (4121). The example embodiment is shown in FIG. 3A demonstrates such a case, wherein each oriented antenna (4121) is a polyrod antenna, wherein the term polyrod antenna may describe an antenna that may employ a structural dielectric of high relative permittivity for the purpose of aiding in shaping the antenna's radiation pattern. In the case of the example embodiment shown in FIG. 3A, the polyrod antenna directs its radiated power (and prefers its received radiation) by about 17 decibels, or about 50 times the power, with respect to its preferred direction, when compared with a hypothetical antenna that radiates equally in all directions. An antenna's radiation pattern, or antenna pattern, may be defined by the region of solid angle about which its sensitivity decreases by about 3 decibels, or about half, with respect to that of its preferred direction (maximum). The preferred direction for the polyrod antenna may act as the oriented antenna (4121) in the example embodiment shown in FIG. 3A, is along its longest axis, from its stem (4123) to its tip (4124). For ease of reference, the preferred direction for an antenna may be deemed its Poynting ray (4122).

The beamwidth selected, for a polyrod antenna acting as an oriented antenna (4121) in any given application, may be fully discretionary, may be independent of the angular separation between adjacent oriented antennas (4121), and may be independent of the angular separation between adjacent planar stacks (4101). The term beamwidth may refer to the breadth of the antenna pattern, in degrees. A polyrod antenna may require no DC power supply. By increasing the length of a polyrod antenna, its beam may be further narrowed, as a given application may dictate. By decreasing the length of a polyrod antenna, its beam may be further broadened, as a given application may dictate. A polyrod antenna may embed within a polymer matrix a resonant conductor coil along a portion of its length, or the polyrod antenna may be coupled into with some other form of embedded conductor. A polyrod antenna may emit one of either a left-hand circularly polarized beam, or a right-hand circularly polarized beam, a linearly single-polarized beam, or a linearly dual-polarized beam, depending upon the nature of the embedded conductor. In some embodiments, a polyrod antenna may emit or receive different data streams in the nominally vertical (V) polarization and the nominally horizontal (H) polarization for 5G XPIC applications.

A polyrod antenna may be physically scaled for its optimal transmission and reception properties once a designated range of operating frequencies, such as microwave Ka-band and other millimeter wave bands, have been selected. Ka-band may include the high data-capacity frequency segments that may be employed in 5G networking. Microwave Ka-band may include a frequency range of 26.5 to 40 gigahertz. The antenna pattern of the two-dimensional or three-dimensional array (M-by-N) of oriented antennas (4121) may need not necessarily address its entire extent at any given time, wherein the antenna pattern of each individual oriented antenna (4121) may be bounded by a region of solid angle within which antenna gain may decrease by no more than 3 dB. In some embodiments, the two-dimensional or three-dimensional array (M-by-N) may be expressed as a spherical array in three-dimensional Euclidean space. The antenna pattern for the two-dimensional array (M-by-N) of oriented antennas (4121) may be uniformly subdivided into 54, individually, independently, addressable solid angular sub-regions for the case (M=18, N=3), but the concept may be extended to cover more or fewer sub-regions by a suitable adjustment of M and N. Since each rod produces its own individual beam, channel-to-channel equalization is not required. Proprietary rod antenna design enables each individual beam from each rod to be equal to the other beams from the other rods.

Referring now to FIG. 1A and FIG. 3A, each oriented antenna (4121) may comprise a stem (4123) and a tip (4124), and each oriented antenna (4121) may have a Poynting ray (4122) extending from its stem (4123) to its tip (4124) along its longest dimension. The polyrod antenna employed within the example embodiment of the present invention shown in FIG. 3A may demonstrate this very case.

Referring now to FIG. 1A, each oriented antenna (4121) may emit electromagnetic wave energy foremost about along its Poynting ray (4122), and each oriented antenna (4121) may receive electromagnetic wave energy foremost about along the negative of its Poynting ray (4122). Because an oriented antenna (4121) may emit and receive a narrow beam, even if the oriented antenna (4121) may be realized from some other type of antenna than a polyrod, it nonetheless may prefer its Poynting ray (4122). As an example, the oriented antenna (4121) may instead be realized by an array of patch antennas, whose Poynting ray (4122) may be about perpendicular to the plane of the array of patch antennas.

Referring now to FIG. 1A, every Poynting ray (4122) may lie about within a Poynting plane (4125). It may be restated in other words that the Poynting rays (4122) of all oriented antennas (4121) within a given planar stack (4101) may be about coplanar, which may define the notion of the Poynting plane (4125). The orientation of oriented antennas (4121) within a planar stack (4101) therefore may vary with only one degree of freedom, having been constrained to the Poynting plane (4125).

Referring now to FIG. 1A and FIG. 3B, each Poynting ray (4122) may be offset in its angular orientation from each adjacent Poynting ray (4122) by about a constant inter-ray angular offset (4311), in a fanned arrangement. If the antenna pattern covered by the plurality of oriented antennas (4120) within a planar stack (4101) that may employ a constant inter-ray angular offset (4311) may equal the beamwidth of the oriented antennas (4121), then the region of solid angle addressed by the plurality of oriented antennas (4120) within which the antenna pattern of each oriented antenna (4121) decreases by no more than 3 decibels may be about contiguous. Other polymorphic forms, for example, polymorphic forms having a non-uniform distribution or arrangement of antennas are also possible.

Referring now to FIG. 1A, the plurality of transceiver blocks (4110) may comprise N transceiver blocks (4111), and the operation of each transceiver block (4111) may be controlled by the digital control logic (4800). In particular, the digital control logic (4800) may be induced to configure the level of power gain applied by each amplifier that may reside within a transceiver block (4111), and may be induced to configure the direction in which power gain is applied, as may be appropriate for transmit or receive through the oriented antenna (4121). The term power gain may refer to the ratio of output power from a block to the input power to a block and therefore may imply a direction, or sense, of operation for the block.

Referring now to FIG. 1A, each transceiver block (4111) may accept a transmit/receive mode control signal from the digital control logic (4800), and each transceiver block (4111) may employ variable levels of radio-frequency power amplification, and each transceiver may comprise a transceiver block first port (4112) and a transceiver block second port (4113). When the transceiver block (4111) may be configured for transmission, the transceiver block first port (4112) may constitute the output and the transceiver block second port (4113) may constitute the input of the transceiver block (4111).

Alternatively, when the transceiver block (4111) may be configured for receiving, the transceiver block second port (4113) may constitute the output and the transceiver block first port (4112) may constitute the input of the transceiver block (4111). Each transceiver block (4111) may accept signal flow direction control, specifically: up-convert (transmit) to invoke power amplification, or down-convert (receive) to invoke low-noise amplification. The signal conditioning applied may be suitable for millimeter-wave applications. Each transceiver block (4111) may include any to all of low-noise amplification, power amplification, transmit/receive switches, and frequency-selective filtering. Controlling bias power (power supply) on/off reduces antenna power consumption thus enabling CW operation. Each transceiver block (4111) may provide individually, independently, selectable degrees of signal conditioning to each oriented antenna (4121), with respect to any radio (4401). Referring now to FIG. 1A, each transceiver block (4111) may connect electrically via its transceiver block first port (4112) to the stem (4123) of the respective oriented antenna (4121).

Referring now to FIG. 1A and FIG. 3A, the plurality of 1-pole R-throw radio selectors (4130) may comprise N 1-pole R-throw radio selectors (4131), and each 1-pole R-throw radio selector (4131) may comprise a radio selector common port (4132) and a radio selector plurality of switch ports (4133), which may comprise R radio selector switch ports (4134). Each 1-pole, R-throw radio selector (4131) may function as if it were a 1-pole R-throw switch, in other words, exactly one radio selector switch port (4134) may be connected electrically to the radio selector common port (4132) at any given time. Further, because the present invention may operate with high frequencies of electromagnetic wave energy such that the physical extent of the present invention may be many wavelengths at those frequencies, the 1-pole R-throw radio selector (4131) may present a matched impedance (low voltage standing-wave ratio (VSWR)) to transmission line media that may connect to its ports regardless of which radio selector switch port (4134) may be connected electrically to the radio selector common port (4132) at any given time. By way of example, the wavelength of electromagnetic radiation traveling in free space at 29.9 gigahertz may be about 1 centimeter. The example embodiment of the present invention shown in FIG. 3A, which may operate at about 29.9 gigahertz, extends about 30 centimeters from the tip of one oriented antenna (4121) to the tip of the oriented antenna (4121) opposite it, a distance that may greatly exceed one wavelength, or 1 centimeter in this example. By way of example, the wavelength of electromagnetic radiation traveling in free space at 29.9 gigahertz may be about 1 centimeter. The present invention may operate with high frequencies of electromagnetic wave energy such that the physical extent of the present invention may be many wavelengths at those frequencies.

Referring now to FIG. 1A, the operation of each 1-pole R-throw radio selector (4131) may be controlled by the digital control logic (4800). The effect of the control may be to choose which radio selector switch port (4134) may connect to the radio selector common port (4132) at any given time, individually for each 1-pole R-throw radio selector (4131).

Referring now to FIG. 1A, the function of each 1-pole R-throw radio selector (4131) may be that of a matched 1-pole R-throw switch between the radio selector plurality of switch ports (4133), and the radio selector common port (4132), and each 1-pole R-throw radio selector (4131) may connect electrically via its radio selector common port (4132) to its respective transceiver block (4111) via its transceiver block second port (4113). Each 1-pole, R-throw radio selector (4131) may function as if it were a 1-pole R-throw switch, in other words, exactly one radio selector switch port (4134) may be connected electrically to the radio selector common port (4132) at any given time.

Because the present invention may operate with high frequencies of electromagnetic wave energy such that the physical extent of the present invention may be many wavelengths at those frequencies, the 1-pole R-throw radio selector (4131) may present a matched impedance (low voltage standing-wave ratio (VSWR)) to transmission line media that may connect to its ports regardless of which radio selector switch port (4134) may be connected electrically to the radio selector common port (4132) at any given time. Every oriented antenna (4121) within the M-by-N array may access any given radio (4401) with equal agility, i.e., in the order of 10 nanoseconds. Such access may apply equally to azimuth, and to elevation.

Referring now to FIG. 1A, the plurality of stack radio feed ports (4140) may comprise R stack radio feed ports (4141), and the plurality of stack radio feed ports (4140) may connect respectively, electrically, to the plurality of radio selector switch ports (4133) of every 1-pole R-throw radio selector (4131). The interface to the plurality of radios (4400) from the planar stack (4101), and hence from the oriented antennas (4121) thereby may be contained to the plurality of stack radio feed ports (4140).

Referring now to FIG. 1C and FIG. 3A, each of M Poynting planes (4125) from among the plurality of planar stacks (4100) may be offset in its angular orientation from each adjacent Poynting plane (4125) by about a constant inter-plane angular offset (4312), such that the plurality of planar stacks (4100) may form a fanned arrangement about around an array axis of symmetry (4300) lying about in the geometric plane of every of M Poynting planes (4125), wherein the constant inter-plane angular offset (4312) may measure about 360 degrees/M. When the beamwidth of the oriented antennas (4121) may be about the same as the constant inter-plane angular offset (4312) and the constant inter-ray angular offset (4311), then the present invention may receive and transmit wirelessly within a belt whose solid-angular extent is 360 degrees in azimuth, and N times the inter-ray angular offset (4311) in elevation. If the beamwidth of the oriented antennas (4121) were to decrease due to an intentional variation in their physical properties, then the same belt of solid-angular extent would remain contiguously covered by receive and transmit if the parameters M and N were increased accordingly. In some embodiments, other polymorphic forms may be possible.

Referring now to FIG. 1C, the plurality of radio feeds (4200) may comprise R radio feeds (4201), and every plurality of stack radio feed ports (4140) may connect respectively, electrically, to a plurality of radio feeds (4200). Because the present invention may operate with high frequencies of electromagnetic wave energy such that the physical extent of the present invention may be many wavelengths at those frequencies, the plurality of radio feeds (4200) may present a matched impedance (low voltage standing-wave ratio (VSWR)) to transmission line media that may connect to its ports. Therefore, every plurality of stack radio feed ports (4140) that may be associated with each planar stack (4101) may connect electrically to a matched impedance port belonging to the plurality of radio feeds (4200).

Referring now to FIG. 1A, the plurality of radios (4400) may comprise: R radios (4401); a plurality of radio feed ports (4402), which may comprise R radio feed ports (4403); and a plurality of input-output radio-frequency ports (4404), which may comprise R input-output radio-frequency ports (4405). The elements constituting the plurality of radios (4400) may all have a multiplicity of R, the number of radios (4401).

Referring now to FIG. 1A, the operation of each radio (4401) may be controlled by the digital control logic (4800), and each radio (4401) may accept an independent transmit/receive mode control signal from the digital control logic (4800). The digital control logic (4800) may be aware of transmit or receive mode of each radio (4401), and of the connections made by the 1-pole R-throw radio selectors (4131) to the pluralities of transceiver blocks (4110) within the plurality of planar stacks (4100), and accordingly may synchronize the transmit or receive mode of each transceiver block (4111) with that of its connected radio (4401).

Referring now to FIG. 1A and FIG. 4, each radio (4401) may either up-convert from a lower radio-frequency band on its input-output radio-frequency port (4405) to a higher radio-frequency band on its radio feed port (4403) for transmission or down-convert from the higher radio-frequency band on its radio feed port (4403) to the lower radio-frequency band on its input-output radio-frequency port (4405) for reception. Each radio (4401) may expect the signal to up-converted or down-converted at its input-output radio-frequency port (4405) to reside within some lower radio-frequency band, such as, for example S-band (2 gigahertz to 4 gigahertz). Signals in the S-band range may be commonly handled by wireless communications networking equipment today and may be less sensitive to degradation due to signal handling than signals within some higher radio-frequency bands, such that the present invention may hide some of the complexity of handling signals within some higher radio-frequency band. The higher radio-frequency band may be, for example, Ka-band (26.5 gigahertz to 40 gigahertz). The spectrum of signals passed by the 1-pole R-throw radio selectors (4131) may reside within the higher radio-frequency band.

Together, the plurality of 1-pole R-throw radio selectors (4130) and the plurality of transceiver blocks (4110) may constitute an active switch matrix. The logical operation to configure the active switch matrix may reside within a lookup table within an FPGA (field-programmable gate array) within the digital control logic (4800). The higher radio-frequency band may reside at a much higher radio-frequency frequency than the lower radio-frequency band, as a result of the up/down-converter, i.e., the radio (4401), inside the multiple-input multiple-output wireless system (MIMO) (4000). The wireless (free-space electromagnetic radiation) port of the multiple-input multiple-output wireless system (MIMO) (4000) may be the oriented antenna (4121). The R radios (4401) may be independent and may simultaneously be in transmit or receive mode.

The R radios (4401), and therefore the present invention, may be agnostic to any RF data that may traverse them, and therefore it. As used herein "agnostic" means "without knowledge". As a non-limiting example, the term agnostic may signify that digital data streams, which may be borne on the electromagnetic spectrum that the multiple-input multiple-output wireless system (MIMO) (4000) processes, may be unintelligible to the multiple-input multiple-output wireless system (MIMO) (4000) because it, the present invention, may be by design and as a security feature structurally incapable of understanding them. The motivation for up/down conversion may be to accommodate the use of many existing radios which may operate in the S-band and C-band ranges of electromagnetic radiation.

Referring now to FIG. 1A, each radio (4401) may connect, on a higher radio-frequency band, via a respective radio feed port (4403) to a respective radio feed (4201), which is made available to every oriented antenna (4121) by the each of the pluralities of 1-pole R-throw radio selectors (4130) within the plurality of planar stacks (4100). Referring to FIG. 1C, the digital control logic (4800) may comprise a control port (4801), and the digital control logic (4800) may control the coordinated operation of the plurality of planar stacks (4100) and the plurality of radios (4400) to select either up-convert or down-convert individually for each radio (4401). The digital control logic (4800) may configure the plurality of 1-pole R-throw radio selectors (4130) and the plurality of transceiver blocks (4110) according to whether each oriented antenna (4121) is connected to a radio (4401) whose mode is up-convert, or down-convert.

Referring now to FIG. 1C and FIG. 4, the digital control logic (4800) may receive control commands belonging a concise command language via its control port (4801), wherein the concise command may consist of 2-byte strings or 3-byte strings, and the concise command language may connect electrically each oriented antenna (4121) with its selected radio (4401) accordingly in consideration of whether the radio (4401) is operating to up-convert, or to down-convert. In some embodiments, the concise command language may consist of strings of lengths of less than 2, 3, 4, 5, 6, 7, 8, 9, 10, 20, 50, or 100 bytes. In some embodiments, the control word may be larger than 16 bits, such as for example when: R=8, representable by 3 bits; M=18, representable by 5 bits; transmit/receive, representable by 1 bit; transmit automatic gain control (AGC), representable by 5 bits; receive automatic gain control (AGC), representable by 5 bits; power control on/off, representable by 1 bit; wherein the total of bits may be 20 bits.

Because the multiple-input multiple-output wireless system (MIMO) (4000), the present invention, may have a high multiplicity of possible configurations in view of the magnitude of the parameters M, N, and R, a concise and efficient method of configuring the present invention may provide great practical benefit, and may relieve the user of the present invention of the burden of choosing among only the functionally valid of the possible configurations, for instance, the mutual consistency of transmit or receive mode among radios (4401) and transceiver blocks (4111) depending upon the configuration of the 1-pole R-throw radio selectors (4131). The concise command language may validly connect any given oriented antenna (4121) to any given radio (4401), and configure said connection for up-convert or down-convert with a multi-byte sequence (for example a two-byte (16-bit) or a three-byte (20-bit)) sequence, wherein the subsequent latency to implement the connection is in the order of 10 nanoseconds. The present invention therefore may embody potentially the fastest beam-pointing technology available as of this time.

Referring now to FIG. 1A and FIG. 1C, the plurality of radios (4400) may connect respectively, electrically, to the plurality of radio feeds (4200) via the plurality of radio feed ports (4402), and the plurality of radios (4400) may connect respectively, electrically, to the plurality of input-output radio-frequency connectors (4700) via a plurality of input-output radio-frequency ports (4404).

Referring now to FIG. 1C and FIG. 3A, the multiple-input multiple-output wireless system (MIMO) (4000) may effect independent control of up-converted, radiated, electromagnetic wave power, and down-converted, incident, electromagnetic wave power sensitivity, for each oriented antenna (4121), wherein the total number of oriented antennas (4121) is M times N. When multiple radios (4101) may engage the free-space media wirelessly via the oriented antennas (4121), efficient use of the free-space media may be maximized by transmitting and receiving only within minimal regions of solid angle as may be necessary for corresponding communication stations to engage with, and transmitting only the minimum power levels necessary for corresponding communication stations to effectively receive. In the example embodiment of the present invention shown in FIG. 3A, wherein M=18 and N=3, there may be 54 independently controllable narrow beams, each of whose orientations may be fixed with respect to the orientation of the multiple-input multiple-output wireless system (MIMO)

(4000), but whose transmit power and receive sensitivity may be individually controllable.

Referring now to FIG. 1C and FIG. 3A, each given oriented antenna (4121) may dominate, within its respective sub-region of solid-angular coverage, the response of all other oriented antennas (4121), and therefore the control of radiated power and received sensitivity to each sub-region may be about orthogonal. When the beamwidth of the oriented antennas (4121) may about equal the inter-ray angular offset (4311) between them within a planar stack (4101), and the beamwidth of the oriented antennas (4121) may about equal the inter-plane angular offset (4312) between planar stacks (4101), then each given oriented antenna (4121) may be more sensitive along its Poynting ray (4122) than any other oriented antenna (4122), and therefore control of the transmit power level and receive sensitivity of the transceiver block (4111) for the given oriented antenna (4121) may have about no effect upon any other oriented antenna (4121) along its respective Poynting ray (4122).

Referring now to FIG. 1C and FIG. 3A, any first given radio (4401) may be configured to address any given subset of the entirety of solid-angular sub-regions, then any second given radio (4401) may be configured to address any subset of the remaining solid-angular sub-regions not yet addressed, and in general, the pattern established for the first given radio (4401) and the second given radio (4401) may be continued such that each of the remaining radios (4401) in turn may be configured to address any subset of the remaining solid-angular sub-regions not yet addressed, until either no solid-angular sub-regions remain unaddressed, or all R radios (4401) require no further solid-angular sub-regions of address. In other words, any given oriented antenna (4121) may be exclusively connected to by some radio (4401), or any given collection of oriented antennas (4121) may be exclusively connected to by some radio (4401) due to the digital control logic (4800) responding to the concise command language; and, any given oriented antenna (4121), to all given oriented antennas (4121), may freely be ignored by all radios (4121) due to the digital control logic (4800) responding to the concise command language.

Accordingly, the multiple-input multiple-output wireless system (MIMO) (4000) may provide efficient radio coverage of the entire solid-angular region addressed wirelessly by the multiple-input multiple-output wireless system (MIMO) (4000), with respect to the location of the multiple-input multiple-output wireless system (MIMO) (4000).

Referring now to FIG. 1A and FIG. 3A, in some embodiments, the oriented antenna (4121) may be a rod type antenna having a tip (4124) and a stem (4123), from which the oriented antenna (4121) is fed by the respective transceiver block first port (4112), while in other embodiments the oriented antenna (4121) may retain only a stem (4123) from which it is fed by the respective transceiver block first port (4112). As long as the oriented antenna (4121) may form a narrow beam, it is permitted not to be required to take the form of a rod antenna. As an example, the oriented antenna (4121) may instead be realized by an array of patch antennas, whose Poynting ray (4122) may be about perpendicular to the plane of the array of patch antennas. In such a case, it retains a port from which it is fed, and this port may be considered the stem (4123) of the oriented antenna (4121).

Referring now to FIG. 4, in some embodiments, the three-dimensional (3D) multiple-input multiple-output wireless system (MIMO) (4000) may comprise a radio-frequency fanning network (4180). The radio-frequency fanning network (4180) may be some functionally equivalent generalization of pluralities of 1-pole R-throw radio selectors (4130) within the plurality of planar stacks (4100), collected into a single conceptual unit. The radio-frequency fanning network (4180) may therefore comprise a first plurality of ports R in number, and a second plurality of ports M in number, and M may represent the value M times N as a matter of notational convenience.

Referring now to FIGS. 2A, 2B, 3A, and 3B, in some embodiments: the number of planar stacks (4101), M, may be 18, the number of oriented antennas (4121) per planar stack (4101), N, may be 3; the number of radios (4401), R, may be 8, and the constant inter-ray angular offset (4311) may be about 20 degrees, and the constant inter-plane angular offset (4312) may be about 20 degrees; and the oriented antennas (4121) may be polyrod antennas. In the example embodiment of the present invention shown in FIGS. 2A, 2B, 3A, and 3B, these attributes may be observed. In FIG. 2B, the plurality of input-output radio-frequency connectors (4700) may be observed to include 8 connectors, and may imply the number of radios (4401), R, to be 8.

Referring now to FIGS. 2A, 2B, 3A, and 3B, in some embodiments, the lower radio-frequency band may reside within the S-band, and the higher radio-frequency band may reside within the Ka-band. The example embodiment may have been developed for fifth-generation (5G) networking infrastructure deployment, in which case the lower radio-frequency band may reside within S-band, and the higher radio-frequency band may reside within Ka-band.

Referring now to FIG. 1C and FIG. 4, in some embodiments, the digital control logic (4800) may be implemented within one or several field-programmable gate arrays (FPGA) or within one or several application-specific integrated circuits (ASIC), and some embodiments, the digital control logic (4800) may comprise a microprocessor. Since FPGAs may provide microprocessor functionality on-chip, and since FPGA's may provide nearly optimal deployment of digital logic realizations, and since ASICs may provide yet more optimal deployment of digital logic realizations, the present invention may include these features.

Referring now to FIG. 1C and FIG. 4, in some embodiments, the latency to reconfigure the multiple-input multiple-output wireless system (MIMO) (4000) via the digital control logic (4800) may be less than 10 nanoseconds. In other embodiments, the latency to reconfigure the multiple-input multiple-output wireless system (MIMO) (4000) via the digital control logic (4800) may be less than about 10, 20, 30, 40, 50, 60, 70, 80, 90, 100, 110, 120, 130, 140, 150, 160, 170, 180, 190, or 200 nanoseconds. The latency may be defined as the difference in time between when a command from the concise command language is latched into the control port (4801), and when a given 1-pole R-throw radio selector (4131) and a given transceiver block (4111) actuate the command. The present invention therefore may embody potentially the fastest beam-pointing technology available as of this time.

Referring now to FIG. 1C and FIG. 4, in some embodiments, the multiple-input multiple-output wireless system (MIMO) (4000) may be embedded within a radar exciter array, a radar (passive or active) receiver array, a jammer, a digital radio-frequency memory jammer, a wireless network repeater system, or a 5G base station. The present invention may find application in electronic warfare contexts, or in wireless network communications network infrastructure such as networked military and commercial radio and 5G networking. The plurality of input-output radio-frequency ports (4404) may be connected to the signal path and consists of an external radio or exciter/receiver array.

In some embodiments, the lower radio-frequency band may reside within any of S-band, C-band, Ka-band, Ku-band, E-band, V-band, X-band, L-band or W-band, and in some embodiments, the higher radio-frequency band may reside within any of S-band, C-band, Ka-band, Ku-band, E-band, V-band, X-band, L-band or W-band. S-band may include electromagnetic radiation in frequencies in the range from 1.550 gigahertz to 3.990 gigahertz. C-band may include electromagnetic radiation in frequencies in the range from 3.900 gigahertz to 6.200 gigahertz. Ka-band may include electromagnetic radiation in frequencies in the range from 20.000 gigahertz to 36.000 gigahertz. Ku-band may include electromagnetic radiation in frequencies in the range from 10.900 gigahertz to 20.000 gigahertz. E-band may include electromagnetic radiation in frequencies in the range from 2.000 gigahertz to 3.000 gigahertz. V-band may include electromagnetic radiation in frequencies in the range from 46.000 gigahertz to 56.000 gigahertz. X-band may include electromagnetic radiation in frequencies in the range from 6.200 gigahertz to 10.900 gigahertz. L-band may include electromagnetic radiation in frequencies in the range from 40.000 gigahertz to 60.000 gigahertz. W-band may include electromagnetic radiation in frequencies in the range from 56.000 gigahertz to 100.000 gigahertz.

In some embodiments, the beam of electromagnetic radiation emitted by each oriented antenna (4121) may be either circularly polarized or linearly polarized. In some embodiments, the beam of electromagnetic radiation emitted by each oriented antenna (4121) may be linearly single-polarized or linearly dual-polarized. In some embodiments, the concise command language may comprise commands consisting of a 2-bytes (16-bits) or a 3-bytes (20-bits) command strings. In some embodiments, the processing performed by the multiple-input multiple-output wireless system (MIMO) (4000) may be agnostic to any RF data that may traverse it. The term agnostic may signify, within this document, that digital data streams, which may be borne on the electromagnetic spectrum that the multiple-input multiple-output wireless system (MIMO) (4000) processes, may be unintelligible to the multiple-input multiple-output wireless system (MIMO) (4000) because it, the present invention, may be by design and as a security feature structurally incapable of understanding them.

In some embodiments, the transceiver block (4111) may comprise any of: a low-noise amplifier; a power amplifier; a transmit/receive switch; and/or frequency-selective filtering and TX and RX AGCs. The low-noise amplifier may be employed to improve the performance of the present invention when the transceiver block (4111) may operate in conjunction with its respective radio (4401) in down-convert (receive) mode. The power amplifier may be employed to improve the performance of the present invention when the transceiver (4111) may operate in conjunction with its respective radio (4401) in up-convert (transmit) mode. The frequency-selective filtering may reduce out-of-band radiated power by the power amplifier when the transceiver block (4111) operates in transmit mode, and the frequency-selective filtering may maintain the dynamic range of the low-noise amplifier when the transceiver block (4111) may operate in receive mode.

Out-of-band radiated power may be defined as radiated power outside the band of frequencies of electromagnetic radiation licensed to the operator of the present invention. Dynamic range may be defined as the ratio of signal power to the aggregate of noise power plus spurious power. The transceiver block (4111) will have automatic gain control (AGC) in both directions, not so dynamic, which may be used to equalize the signal level for each transceiver or radio-frequency (RF) path. The AGC commands are not permitted to switch at the beam pointing rate. The automatic gain control (AGC) may be used for signal-to-noise ratio (SNR) optimization dynamic range control and chain gain equalization. Power consumption minimization is critical, so each Power Amplifier in the transceiver is turned off when not in use or in receive mode, conversely the bias power is turned off in the transceiver's receive chain when not in use or in transmit mode. (See FIG. 4 power control.)

Referring now to FIGS. 2A and 2B, in some embodiments, the multiple-input multiple-output wireless system (MIMO) (4000) may be internally cable-less and in some embodiments, each oriented antenna (4121) may be a polyrod antenna. In the example embodiment shown in FIGS. 2A and 2B, the assembly may be seen to include no cabling, which may reduce the overall cost to produce the present invention, and may increase its reliability. Further, each of the oriented antennas (4121) in the example embodiment may be a polyrod antenna whose Poynting ray (4122) lies along the longest dimension from its stem (4123) to its tip (4124). In some embodiments, every oriented antenna (4121) may transmit or receive within any of S-band, C-band, Ka-band, Ku-band, E-band, V-band, X-band, L-band or W-band.

In some embodiments, each given oriented antenna (4121) may dominate, within its respective sub-region of solid-angular coverage, the response of all other oriented antennas (4121). When the beamwidth of the oriented antennas (4121) may about equal the inter-ray angular offset (4311) between them within a planar stack (4101), and the beamwidth of the oriented antennas (4121) may about equal the inter-plane angular offset (4312) between planar stacks (4101), then each given oriented antenna (4121) may be more sensitive along its Poynting ray (4122) than any other oriented antenna (4122), and therefore control of the transmit power level and receive sensitivity of the transceiver block (4111) for the given oriented antenna (4121) may have about no effect upon any other oriented antenna (4121) along its respective Poynting ray (4122).

Within this document, the term 'passive' may denote a property of a multi-port linear electrical network such that said network may be incapable of power amplification, of any signal power level inbound upon any of its ports, on to some signal power level outbound from any of its ports. The terms 'lossy' and 'lossless' may further distinguish special cases of passive networks. By contrast, the term 'active' may denote the logical complement or opposite of the passive property, when describing a multi-port linear electrical network. A multi-port linear electrical network whose description may be given in terms of scattering parameters (s-parameters) may be recognized as a passive network by the property that all of its matrix elements may have a magnitude less than or equal to one, given that identical reference impedances (Z0) may be associated with every port.

Within this document, "orthogonality" refers to an independence of control, such that the control of one component (such as an antenna) is independent from control of another component (such as a neighboring antenna). For example, if the control of radiated power and received sensitivity to multiple antennas is "orthogonal," then the radiated power and received sensitivity of each antenna may be controlled independently of the control of radiated power and received sensitivity of the other antennas, without impacting their radiated power or received sensitivity. Generally, the term 'orthogonal' denotes a relationship among mathematical vectors which is tantamount to independence, in other words in which the projection of one vector on another may be zero. For example, Euclidean vectors in three-dimensional space (vectors of length 3) may be orthogonal to each other if the dot product between them evaluates to zero. More generally, the projection of a first output of a multi-dimensional signal processing system may be orthogonal to, or independent of, some second output if any modulation of the first output may be accommodated while maintaining zero projection upon the second output, and vice versa. Orthogonality among the outputs of a multi-dimensional signal processing system, if at all possible, may depend upon the determination of a suitable control scheme governing the system's independently controllable inputs.

A three-dimensional (3D) multiple-input multiple-output wireless system (MIMO) may comprise: a plurality of radios, a plurality of mutually uniquely oriented active antennas, and an interconnect fabric. The interconnect fabric may mediate electrical connections between the multiplicity of radios and the multiplicity of uniquely oriented active antennas. The interconnect fabric may be configured to connect electrically each oriented antenna with at most one of the multiplicity of radios. The interconnect fabric may be a logical conception rather than an isolable physical fabric. The interconnect fabric, in any given one of its possible configurations, may be a passive multi-port linear electrical network. An active antenna may incorporate configurable levels of power amplification and said power amplification may be configurable independently of any power amplification capability within a given radio. One of the plurality of mutually uniquely oriented active antennas may be better oriented to address a given particular elevation and azimuth pair direction in free space with electromagnetic wave energy than any other of the mutually uniquely oriented active antennas.

The narrow beam of each active antenna may primarily address a respective solid-angular region. A uniquely oriented active antenna whose antenna pattern may have a beamwidth less than or comparable to the angular spacing between its orientation and that of its closest neighbors may address a solid-angular region of free space without significant redundancy, overlap, or gaps in coverage. A uniquely oriented active antenna that may primarily address its respective solid-angular region, favorably when compared with all other uniquely oriented active antennas, may dominate its respective solid-angular region.

The interconnect fabric and the gain level of each active antenna may be configured independently and dynamically so as to connect electrically each active antenna to any or none of the plurality of radios at any given time, so as to provide efficient radio coverage of the totality of solid-angular regions addressed wirelessly by the MIMO. The MIMO of the present invention may distribute and receive electromagnetic wave energy primarily in an optimal direction, and at an optimal level, in a manner that may vary dynamically over time, toward the satisfaction of whatever goals the system enclosing the MIMO may require.

In some embodiments, the interconnect fabric may be a routing network (5101) that may be capable of electrically connecting any given active antenna with at most any single radio at any given time, wherein the electrical connection is bi-directional. The term 'routing network' may denote a configurable collection of electrical connections between a first set of ports, each of which may be associated with one of the plurality of active antennas, and a second set of ports, each of which may be associated with one of the plurality of radios. The term 'routing network' may merely elaborate upon and re-state the properties of the interconnect fabric. The connections established by the routing network (5101) therefore may be deemed bi-directional. A valid configuration within the routing network (5101) may fan out connections from a given radio to several antennas, while a valid connection within the routing network (5101) may connect a given antenna to at most one radio.

In some embodiments, the MIMO may have a digital control logic, and the digital control logic may be configured to coordinate the operation of the plurality of radios and the plurality of active antennas to either up-convert or down-convert. The digital control logic may affect the configuration of each active antenna such that it may be consistent with the radio to which the configuration of the interconnect fabric connects the active antenna.

In some embodiments, each active antenna may be configured to up-convert whenever the radio to which said active antenna may be electrically connected may perform up-conversion, and each active antenna may be configured to down-convert whenever the radio to which said active antenna may be electrically connected may perform down-conversion. When the mode of the radio may be configured to up-convert, electromagnetic wave energy may flow from a given radio, through the connection configured within the interconnect fabric, to the active antenna, which may amplify the electromagnetic wave energy incident upon it from the interconnect fabric, and may launch the result into free space electromagnetic radiation. When the mode of the radio may be configured to down-convert, electromagnetic wave energy may flow from the active antenna element, which may amplify the electromagnetic wave energy incident upon it from free space, and may launch the result through the connection configured within the interconnect fabric, to the radio.

In some embodiments, the MIMO may have a digital control logic, and the digital control logic may be configured to direct the operation of each active antenna so as to apply a variable level of radio-frequency amplification specific to said active antenna. The orthogonality, or independence, of control of radio-frequency amplification to each active antenna, may be essential to the present invention. Said control may be affected by a digital control logic.

In some embodiments, the interconnection and gain level of each oriented antenna may be configured independently and dynamically so as to connect electrically each oriented antenna to any or none of the plurality of radios at any given time. The signal paths established within the radio-frequency fanning network between radios and oriented antennas may be reconfigured over time as the system enclosing the MIMO may require. An oriented antenna is permitted not to connect to any radio at all, or an oriented antenna may connect to any single radio, at any given instant.

In some embodiments, each transceiver block may employ variable levels of radio-frequency power amplification, and each transceiver block may be configured to accept a transmit/receive mode control signal from the digital control logic. The transmit/receive mode control signal may correspond, respectively, to the up-convert/down-convert mode of the radio associated by the configuration of the radio-frequency fanning network with a given transceiver, at any given moment.

A media-access-controller (MAC) may access the medium of three-dimensional (3D) free space, and the medium may be multiplexed by solid-angular-division. The MAC may encapsulate a plurality of radios, an interconnect fabric, and a plurality of uniquely oriented active antennas;

in other words, the MAC may comprise a MIMO. As such the MAC may subdivide access to electromagnetic wave energy by partitioning free space into regions of solid-angular coverage, in which each solid-angular region may be dominated by one of the uniquely oriented active antennas.

The MAC may be configured to allocate connections dynamically to a plurality of co-located telecommunication or remote sensing terminals. The MAC may further be configured to multiplex, in a time-varying manner, access by each solid-angular region to at most one of the plurality of telecommunication or remote sensing terminals, at any given time. The MAC may constitute a terminal on a wireless telecommunication link, or it may constitute a station performing remote sensing upon a solid-angular region of free space, such as a radar or light detection and ranging (LIDAR), and may be configurable from wireless to remote sensing, or vice versa. Co-located telecommunication or remote sensing terminals may be connected by media (such as coaxial cabling) other than the free-space electromagnetic medium.

EXAMPLE

The following is a non-limiting example of the present invention. It is to be understood that said example is not intended to limit the present invention in any way. Equivalents or substitutes are within the scope of the present invention.

Referring now to the example embodiment of the present invention shown in FIGS. 2A and 2B, and to FIGS. 3A and 3B, the three-dimensional (3D), 360 degree, omnidirectional multiple-input multiple-output wireless system (MIMO) (4000) was a software-defined radio system, which was made up of a plurality of planar stacks (4100), which comprised M=18 planar stacks (4101). Each planar stack (4101) comprised N=3 oriented antennas (4121). The system further comprised a plurality of radios (4400), which comprised R=8 radios (4401), and a digital control logic (4800), which comprised a control port (4801). The lower radio-frequency band resided within S-band, and the higher radio-frequency band resided within Ka-band, as was convenient for building out 5G wireless network infrastructure. The example embodiment used both as a radio and radar by being able to update via software the right algorithms for those specific applications.

The dynamic range of the example embodiment allowed for lower than-90 decibels, relative to 1 milliwatt, of sensitivity at 5G frequencies that made it first in the market and allowed for substantial range from its base. The example embodiment did this by utilizing up to 8 channels of transmit and receive radio frequency paths. The example embodiment was made up of 8 discrete transmit and receive converters that up-converted to 5G frequencies or any other frequency with beyond 1 GHz bandwidth capability. The example embodiment utilized local oscillators that provided-135 decibels, relative to carrier, per hertz phase noise at 10 kilohertz from the carrier that provided substantial benefit to the 5G movement. The 8 different radios (4401) were routed to 54 different organic-base oriented antennas (4121) that provided 20 degrees beam width with 17 decibels, relative to an isotropic radiator, of gain at 28 GHz.

The example embodiment generated up to more than 40 W of radiated power per multiple-input multiple-output wireless system (MIMO) (4000). There were more than 432 radio frequency traces embedded into an organic printed circuit board that operated at 28 gigahertz. By doing this, the example embodiment substantially reduced the cost of the hardware by eliminating all of the cables and their associated connectors. Existing software defined radios did not have the built-in flexibility of cost and capability. The example embodiment was capable of being used as a repeater at any frequency and a signal booster at any range.

As used herein, the term "about" refers to plus or minus 10% of the referenced number.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A three-dimensional (3D) multiple-input multiple-output wireless system (MIMO) comprising:

N oriented antennas each pointing in a unique direction in 3D space and each comprising a transceiver block;

wherein N is a first fixed positive integer, wherein each oriented antenna comprises a Poynting ray;

wherein each oriented antenna is configured to emit a beam of linearly dual-polarized electromagnetic wave energy along the Poynting ray and receive electromagnetic wave energy along a negative of the Poynting ray;

wherein each Poynting ray is offset in an angular orientation from each adjacent Poynting ray;

wherein each oriented antenna dominates, within a respective sub-region of solid-angular coverage, the response of all other oriented antennas;

a radio-frequency fanning network, configured to connect electrically at most one radio with each oriented antenna at any given instant;

R radios, wherein R is a second fixed positive integer; and a digital control logic, configured to control a coordinated operation of the R radios, the radio-frequency fanning network, and the N transceiver blocks;

wherein control of radiated power and received sensitivity to each sub-region is orthogonal;

wherein any first given radio, from among the R radios, is configured to address any given subset of all solid-angular sub-regions;

wherein then any second given radio is configured to address any subset of remaining solid-angular sub-regions not yet addressed;

wherein a pattern established for the first given radio and the second given radio is continued such that each of the remaining radios in turn is configured to address any subset of the remaining solid-angular sub-regions not yet addressed, until either no solid-angular sub-regions remain unaddressed, or all R radios require no further solid-angular sub-regions of address, so as to provide efficient radio coverage of the entire solid-angular region addressed wirelessly by the MIMO, with respect to a location of the MIMO.

2. A three-dimensional (3D) multiple-input multiple-output wireless system (MIMO) comprising:

a plurality of radios:

N oriented active antennas each pointing in a unique direction in 3D space, each active antenna configured to emit a beam of electromagnetic wave energy; and an interconnect fabric;

wherein a narrow beam of each active antenna addresses a respective solid-angular region;

wherein the interconnect fabric and a gain level of each active antenna are configured independently and dynamically so as to connect electrically each active antenna to any or none of the plurality of radios at any given time, so as to provide efficient radio coverage of a totality of solid-annular regions addressed wirelessly by the MIMO;

wherein the beam of electromagnetic wave energy emitted by each antenna comprises linearly dual-polarized electromagnetic wave energy, linearly single-polarized electromagnetic wave energy, left-hand circularly polarized electromagnetic wave energy, or right-hand circularly polarized electromagnetic wave energy.

3. The MIMO of claim 2, wherein the MIMO is configured to affect independent control of radiated electromagnetic wave power, and incident electromagnetic wave power sensitivity, for each active antenna.

4. The MIMO of claim 2, wherein the active antennas and the interconnect fabric are controlled by a digital control logic; and wherein the digital control logic is controlled by a control port.

5. The MIMO of claim 2, wherein each active antenna has a Poynting ray;

wherein each active antenna is configured to emit electromagnetic wave energy along the Poynting ray and receive electromagnetic wave energy along a negative of the Poynting ray; and wherein each Poynting ray is offset in an angular orientation from each adjacent Poynting ray by an inter-ray angular offset, in a fanned arrangement, or in another polymorphic arrangement.

6. The MIMO of claim 2, the MIMO having a digital control logic, wherein the digital control logic is configured to coordinate an operation of the plurality of radios and the plurality of active antennas to either up-convert or down-convert;

wherein each active antenna is configured to up-convert whenever the radio to which said active antenna is electrically connected performs up-conversion; and wherein each active antenna is configured to down-convert whenever the radio to which said active antenna is electrically connected performs down-conversion.

7. The MIMO of claim 2, the MIMO having a digital control logic, wherein the digital control logic is configured to direct an operation of each active antenna so as to apply a variable level of radio-frequency amplification specific to said active antenna.

8. The MIMO of claim 2, wherein the interconnect fabric is a routing network capable of establishing an electrical connection between any active antenna and at most any single radio at any given time, wherein the electrical connection is bi-directional.

9. The MIMO of claim 2, wherein a first given radio is configured to address any given subset of the totality of solid-angular regions;

wherein a second given radio is configured to address any subset of the remaining solid-angular regions not yet addressed; and wherein a pattern established for the first given radio and the second given radio is continued such that each of the remaining radios in turn is configured to address any subset of the remaining solid-angular regions not yet addressed, until either no solid-angular regions remain unaddressed, or the plurality of radios require no further solid-angular regions of address.

10. A three-dimensional (3D) multiple-input multiple-output wireless system (MIMO) comprising:

N oriented antennas, each pointing in a unique direction in three-dimensional (3D) space, and each comprising a transceiver block, each antenna configured to emit a beam of electromagnetic wave energy, wherein N is a first fixed, positive integer;

R radios, wherein R is a second fixed, positive, integer;

a radio-frequency fanning network, configured to connect electrically at most one radio of the R radios with each oriented antenna at any given instant; and a digital control logic, having a control port by which to receive commands, the digital control logic configured to control a coordinated operation of the radios, the radio-frequency fanning network, and the transceiver blocks;

wherein a control of radiated power and received sensitivity to each oriented antenna is orthogonal, so as to provide efficient radio coverage of an entire solid-angular region addressed wirelessly by the MIMO, with respect to a location of the MIMO;

wherein the radio-frequency fanning network comprises a plurality of 1-pole R-throw radio selectors;

wherein each transceiver block connects electrically to a radio selector common port of the respective 1-pole R-throw radio selector via a transceiver block second port;

wherein a function of each given 1-pole R-throw radio selector is that of a matched 1-pole R-throw switch between a plurality of switch ports and the common port of the given 1-pole R-throw radio selector; and wherein the radio selector plurality of switch ports comprises R radio selector switch ports.

11. The MIMO of claim 10, wherein the radio-frequency fanning network comprises a plurality of stack radio feed ports, comprising R stack radio feed ports;

wherein the plurality of stack radio feed ports connects respectively, electrically, to the plurality of radio selector switch ports of every 1-pole R-throw radio selector; and wherein every plurality of stack radio feed ports connects respectively, electrically to a plurality of radio feeds, comprising R radio feeds.

12. The MIMO of claim 10, wherein the beam of electromagnetic wave energy emitted by each antenna comprises linearly dual-polarized electromagnetic wave energy, linearly single-polarized electromagnetic wave energy, left-hand circularly polarized electromagnetic wave energy, or right-hand circularly polarized electromagnetic wave energy.

13. The MIMO of claim 10, additionally comprising M planar stacks, wherein M is a fixed positive integer; and wherein each of the M planar stacks comprises a plurality of the N oriented antennas.

14. The MIMO of claim 13, wherein each oriented antenna in each planar stack is offset in angular orientation from each adjacent oriented antenna in the same planar stack by a constant inter-plane angular offset, such that the plurality of planar stacks forms a fanned arrangement about an array axis of symmetry, wherein the constant inter-plane angular offset is 360/M degrees.

15. The MIMO of claim 10, wherein each oriented antenna has a Poynting ray;

wherein each oriented antenna emits electromagnetic wave energy along the Poynting ray;

wherein each oriented antenna receives electromagnetic wave energy along a negative of the Poynting ray;

wherein each Poynting ray is offset in an angular orientation from each adjacent Poynting ray by an inter-ray angular offset, in a fanned arrangement, or in another polymorphic arrangement; and wherein each given oriented antenna dominates, within a respective sub-region of solid-angular coverage, a response of all other oriented antennas.

16. The MIMO of claim 15, wherein any first given radio, from among the R radios, is configured to address any given subset of an entirety of solid-angular sub-regions;

wherein then any second given radio is configured to address any subset of the remaining solid-angular sub-regions not yet addressed;

wherein a pattern established for the first given radio and the second given radio is continued such that each of the remaining radios in turn is configured to address any subset of the remaining solid-angular sub-regions not yet addressed, until either no solid-angular sub-regions remain unaddressed, or all R radios require no further solid-angular sub-regions of address, so as to provide efficient radio coverage of the entire solid-angular region addressed wirelessly by the MIMO, with respect to the location of the MIMO.

17. The MIMO of claim 10, wherein an interconnection and gain level of each oriented antenna are configured independently and dynamically so as to connect electrically each oriented antenna to any or none of the plurality of radios at any given time.

18. The MIMO of claim 10, wherein each transceiver block employs variable levels of radio-frequency power amplification; and wherein each transceiver block is configured to accept a transmit/receive mode control signal from the digital control logic.

* * * * *